United States Patent
Rivera

(10) Patent No.: US 12,324,976 B2
(45) Date of Patent: Jun. 10, 2025

(54) OUTDOOR FITNESS PAVILION

(71) Applicant: American Standard Equipment, LLC, Reno, NV (US)

(72) Inventor: Brandon Rivera, Reno, NV (US)

(73) Assignee: American Standard Equipment, LLC, Reno, NV (US)

( * ) Notice: Subject to any disclaimer, the term of this patent is extended or adjusted under 35 U.S.C. 154(b) by 176 days.

(21) Appl. No.: 17/878,269

(22) Filed: Aug. 1, 2022

(65) Prior Publication Data

US 2022/0370878 A1 Nov. 24, 2022

Related U.S. Application Data

(63) Continuation-in-part of application No. 29/734,275, filed on May 11, 2020, now Pat. No. Des. 959,698.

(51) Int. Cl.
| | |
|---|---|
| *A63B 71/02* | (2006.01) |
| *E04B 1/24* | (2006.01) |
| *E04B 1/38* | (2006.01) |
| *E04D 3/30* | (2006.01) |
| *E04F 15/06* | (2006.01) |
| *E04H 3/14* | (2006.01) |
| *H02S 20/23* | (2014.01) |

(52) U.S. Cl.
CPC .......... *A63B 71/023* (2013.01); *E04B 1/2403* (2013.01); *E04B 1/388* (2023.08); *E04D 3/30* (2013.01); *E04F 15/06* (2013.01); *E04H 3/14* (2013.01); *H02S 20/23* (2014.12); *E04B 2001/2415* (2013.01); *E04B 2001/2484* (2013.01); *E04B 2001/389* (2023.08); *E04B 2103/06* (2013.01)

(58) Field of Classification Search
CPC ...................................................... E04D 3/30
See application file for complete search history.

(56) References Cited

U.S. PATENT DOCUMENTS

| | | | | | |
|---|---|---|---|---|---|
| 4,157,089 | A | * | 6/1979 | Loughrey | A61G 13/009 606/245 |
| 4,784,384 | A | * | 11/1988 | Deola | A63B 21/063 482/99 |

(Continued)

FOREIGN PATENT DOCUMENTS

| | | | | |
|---|---|---|---|---|
| FR | 2845613 A1 | * | 4/2004 | ............. A63B 9/00 |
| WO | WO-2016176733 A1 | * | 11/2016 | ............. A63B 17/02 |

OTHER PUBLICATIONS

American Standard Equipment LLC, Photos of fitness equipment from American Standard Equipment at least as early as Sep. 27, 2018.

(Continued)

*Primary Examiner* — Joshua K Ihezie
(74) *Attorney, Agent, or Firm* — Standley Law Group LLP; Adam J. Smith; Jeffrey S. Standley

(57) ABSTRACT

Outdoor fitness pavilions, and systems and methods related to the same are provided. The pavilions include a floor substructure including floor support members, pillars distributed about a perimeter of the floor substructure, a roof substructure including roof support members, at least some of which are connected to the pillars. The pavilion includes integrated fitness equipment items connected to at least some of the pillars.

17 Claims, 25 Drawing Sheets

(56) References Cited

U.S. PATENT DOCUMENTS

| | | | | |
|---|---|---|---|---|
| 4,789,152 | A * | 12/1988 | Guerra | A63B 21/00047 |
| | | | | 482/142 |
| 4,976,623 | A * | 12/1990 | Owsley | A63B 69/0064 |
| | | | | 434/247 |
| 9,308,410 | B2 * | 4/2016 | Beaver | B65D 81/00 |
| 9,404,279 | B1 * | 8/2016 | Fehr | E04H 3/14 |
| 10,576,322 | B2 * | 3/2020 | Schlegel | A63B 23/1227 |
| 11,007,392 | B2 * | 5/2021 | Schlegel | A63B 23/1227 |
| 11,707,662 | B1 * | 7/2023 | Schroeder | A63B 71/02 |
| | | | | 52/126.6 |
| 11,919,436 | B2 * | 3/2024 | Guffey | A63B 71/02 |
| 11,957,971 | B2 * | 4/2024 | Leeman | A63B 9/00 |
| 2005/0252164 | A1 * | 11/2005 | Zupancich | B65D 90/06 |
| | | | | 52/745.02 |
| 2007/0000921 | A1 * | 1/2007 | Butler | B65D 88/121 |
| | | | | 220/1.5 |
| 2007/0265142 | A1 * | 11/2007 | Hwang | A63B 71/02 |
| | | | | 482/52 |
| 2008/0139367 | A1 * | 6/2008 | Cooper | A63B 71/022 |
| | | | | 482/83 |
| 2012/0231935 | A1 * | 9/2012 | Langhart | A63B 71/02 |
| | | | | 135/96 |
| 2013/0247499 | A1 * | 9/2013 | Zimmerman | E04B 1/388 |
| | | | | 52/582.1 |
| 2016/0059104 | A1 * | 3/2016 | Monaco | A63B 71/023 |
| | | | | 280/30 |
| 2016/0059105 | A1 * | 3/2016 | Scade Garcia | A63B 71/02 |
| | | | | 52/64 |
| 2018/0001128 | A1 * | 1/2018 | Norris | A63B 21/0058 |
| 2018/0028852 | A1 * | 2/2018 | Beaver | A63B 71/0036 |
| 2018/0126211 | A1 * | 5/2018 | Chen | A63B 21/075 |
| 2018/0243597 | A1 * | 8/2018 | Schlegel | A63B 23/047 |
| 2022/0362610 | A1 * | 11/2022 | Alberione | A63B 71/02 |
| 2022/0370878 | A1 * | 11/2022 | Rivera | E04D 3/30 |
| 2023/0114752 | A1 * | 4/2023 | Dery | A63B 21/16 |
| | | | | 482/148 |
| 2023/0173971 | A1 * | 6/2023 | Factor | A63B 22/00 |
| | | | | 280/204 |
| 2023/0390624 | A1 | 12/2023 | Schroeder et al. | |
| 2023/0406191 | A1 * | 12/2023 | Guffey | B60P 3/025 |

OTHER PUBLICATIONS

American Standard Equipment LLC, Photos of fitness equipment from American Standard Equipment at least as early as Jul. 29, 2019.

* cited by examiner

OUTDOOR FITNESS PAVILION

CROSS-REFERENCE TO RELATED APPLICATIONS

This application is a continuation-in-part of U.S. application Ser. No. 29/734,275 filed May 11, 2020, the disclosures of which are hereby incorporated by reference as if fully restated herein.

TECHNICAL FIELD

Exemplary embodiments relate generally to outdoor pavilions with integrated fitness equipment, systems and methods related to the same.

BACKGROUND AND SUMMARY OF THE INVENTION

Physical fitness is an important part of maintaining overall health and well-being. It is sometimes desirable to perform at least some such physical fitness activities outdoors. Exercising outdoors may provide more room for certain fitness activities, and may provide its own health benefits. However, certain fitness activities require, or are benefitted by, external equipment. Furthermore, extreme weather conditions can make outdoor exercise difficult. One form of such physical fitness is weight lifting. Weight lifting sometimes requires specialized fitness equipment. Normally, such equipment is stored indoors, in relatively climate-controlled environments, such as to protect the equipment or provide certain climate-controlled conditions for participants.

Outdoor fitness pavilions, and systems and methods related to the same, are provided. The outdoor fitness pavilions may include integrated fitness equipment, such as for certain weight lifting activities. Such equipment may include, for example, without limitation, full or partial weight racks, pull-up bars, rope holders, and/or rope hangers. The outdoor fitness pavilions may include a number of members defining a framework structure. At least some of the members may comprise spaced holes for forming part or all for the integrated weight lifting equipment, such as for accepting hooks, safety bars/catch rails, pull-up bars, combinations thereof, or the like. The spaced holes may also be used to accept bolts or other fasteners for joining the members together. At least some of the members may form a floor support, a roof support, integrated weight lifting equipment supports, storage equipment supports, combinations thereof, or the like. For example, without limitation, at least some of the members may form a grid for supporting a floor of the pavilion. Alternatively, or additionally, at least some of the members may form side members for elevating a roof and/or supporting or providing integrated weight lifting equipment. Alternatively, or additionally, at least some of the members may form roof supports for a roof. The roof may extend over the floor and may be substantially co-extensive therewith.

Fitness pillars forming part of integrated squat racks may be spaced from side pillars. The fitness and side pillars may be used together to support the roof structure, in exemplary embodiments. Certain of the floor members, such as those extending lengthwise, may be unitary.

The pavilion may comprise storage equipment, such as cabinets, lockers, combinations thereof, or the like. The storage equipment may be located outside of a covered area or within the covered area.

Brackets may be provided for joining the various members.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
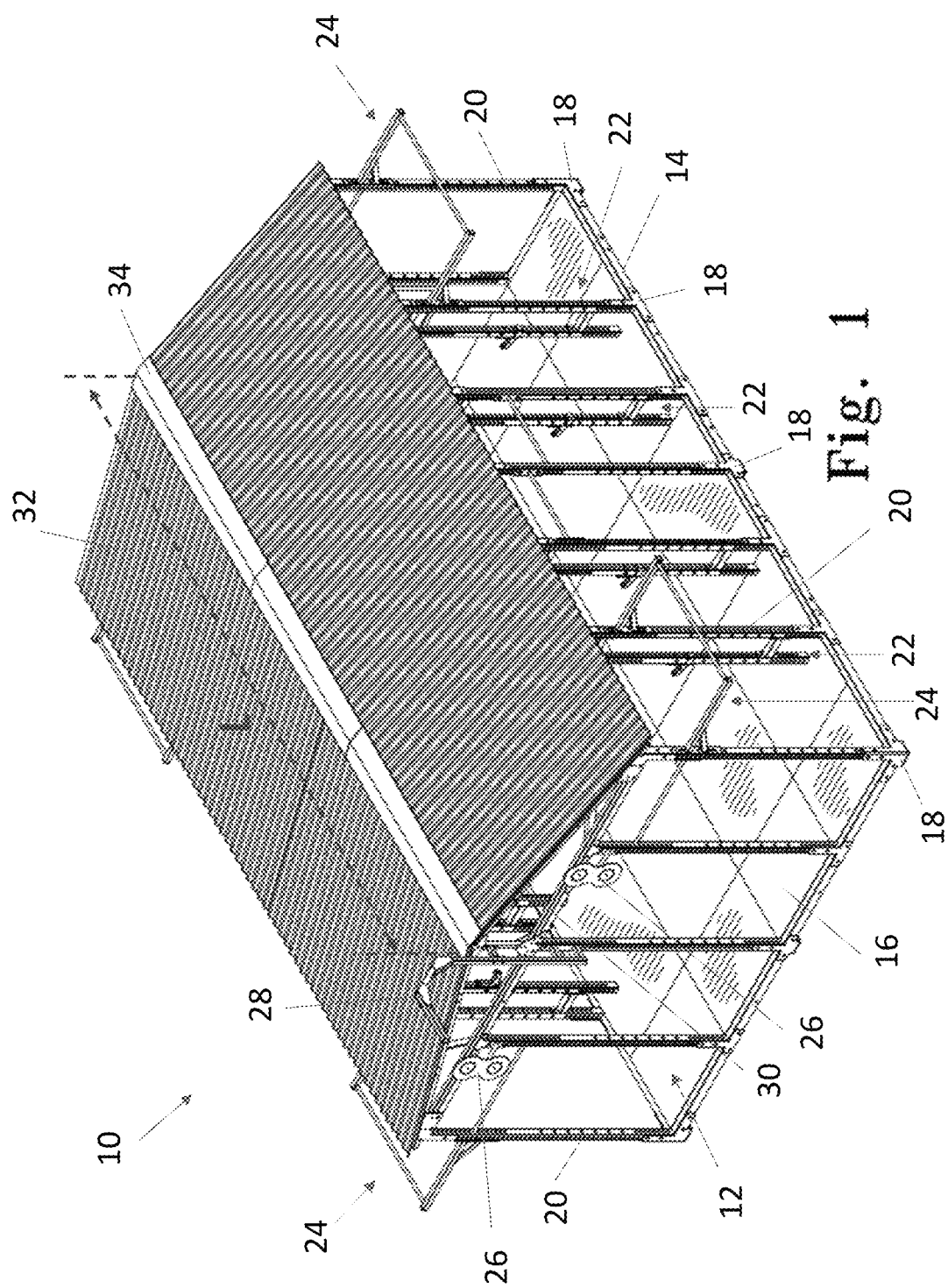
FIG. 1 is a top perspective view of an exemplary outdoor fitness pavilion.
Figure 2:
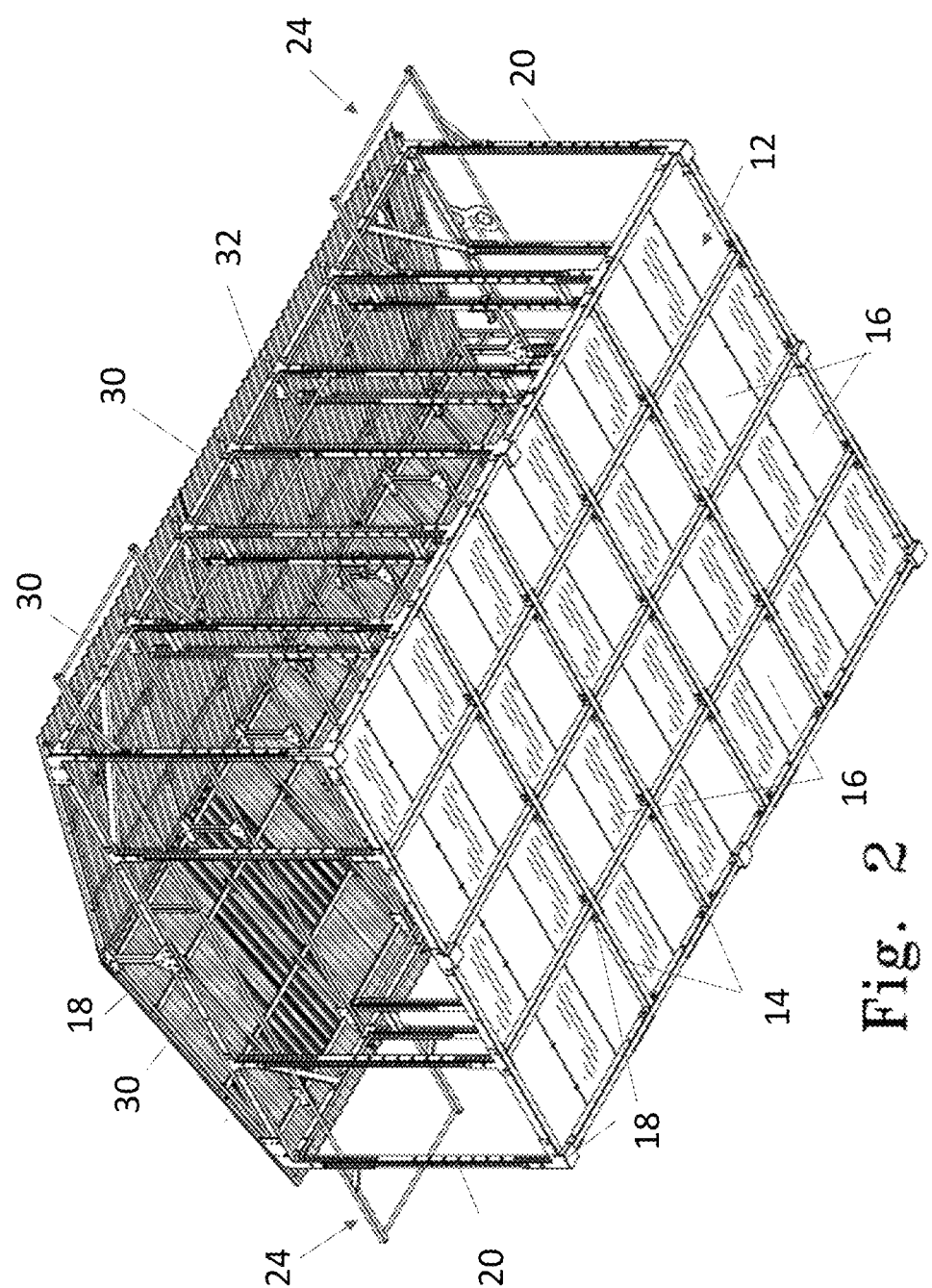
FIG. 2 is a bottom perspective view of the pavilion of FIG. 1.
Figure 3:
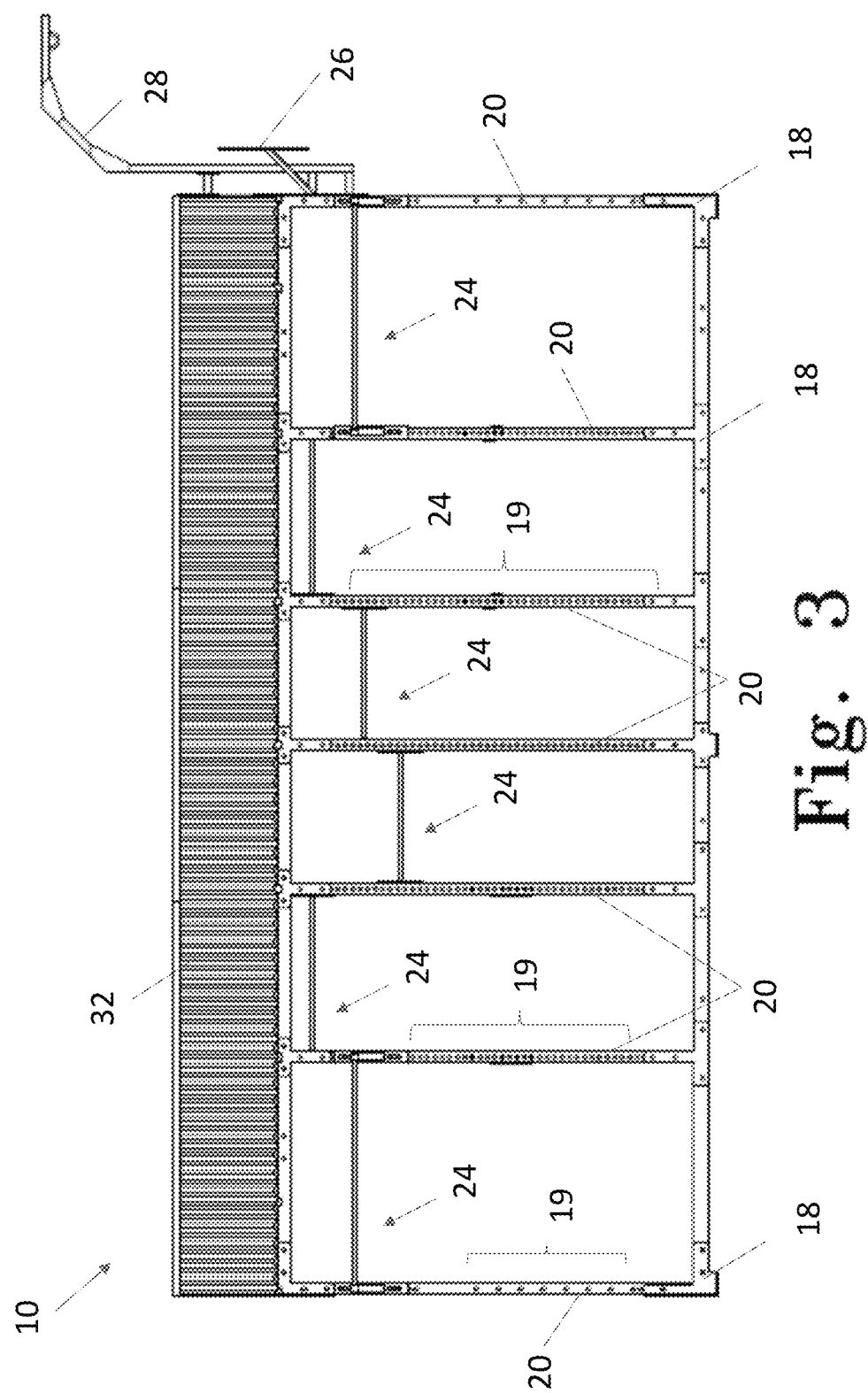
FIG. 3 is a right side elevation view of the pavilion of FIG. 1.
Figure 4:
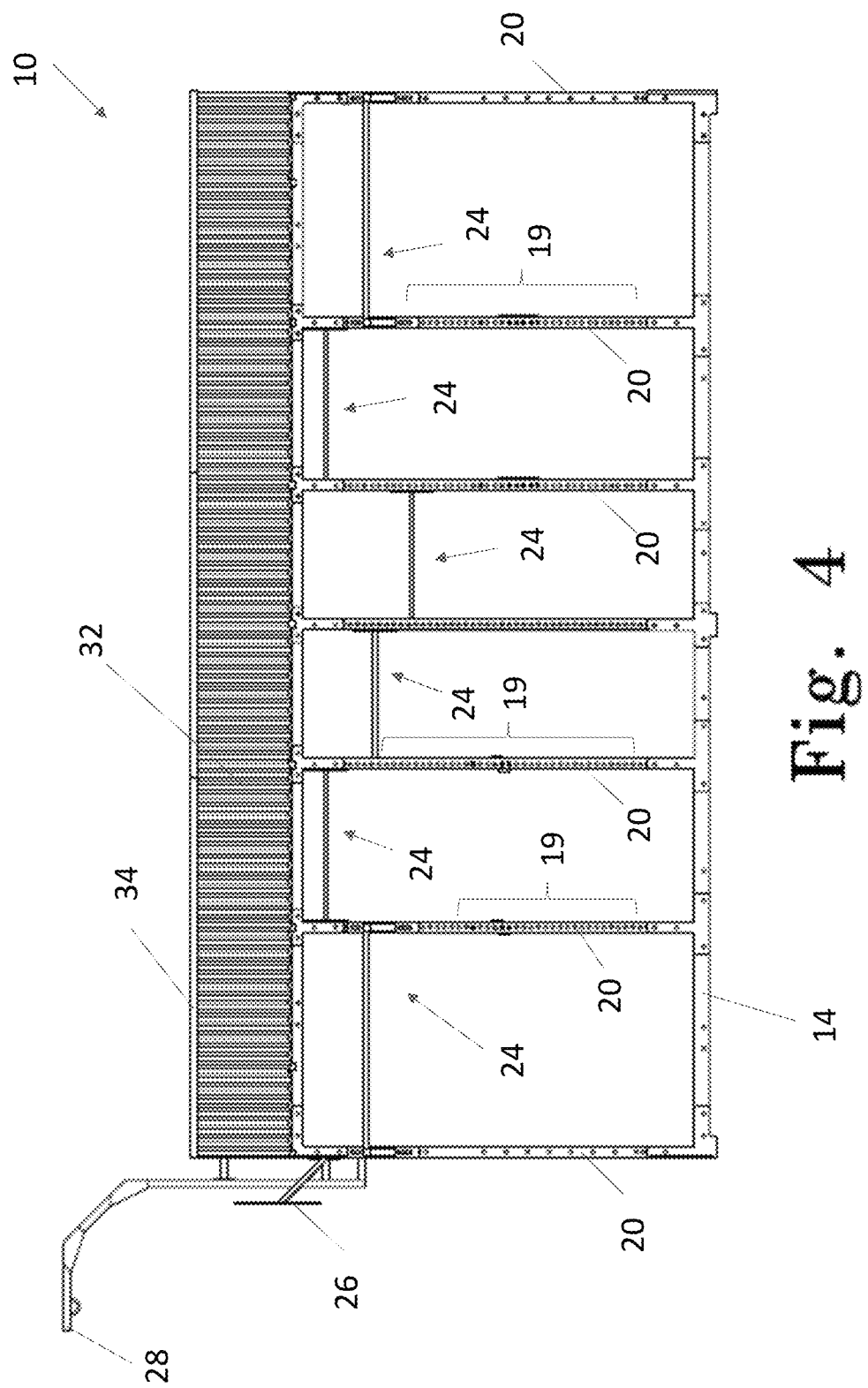
FIG. 4 is a left side elevation view of the pavilion of FIG. 1.
Figure 5:
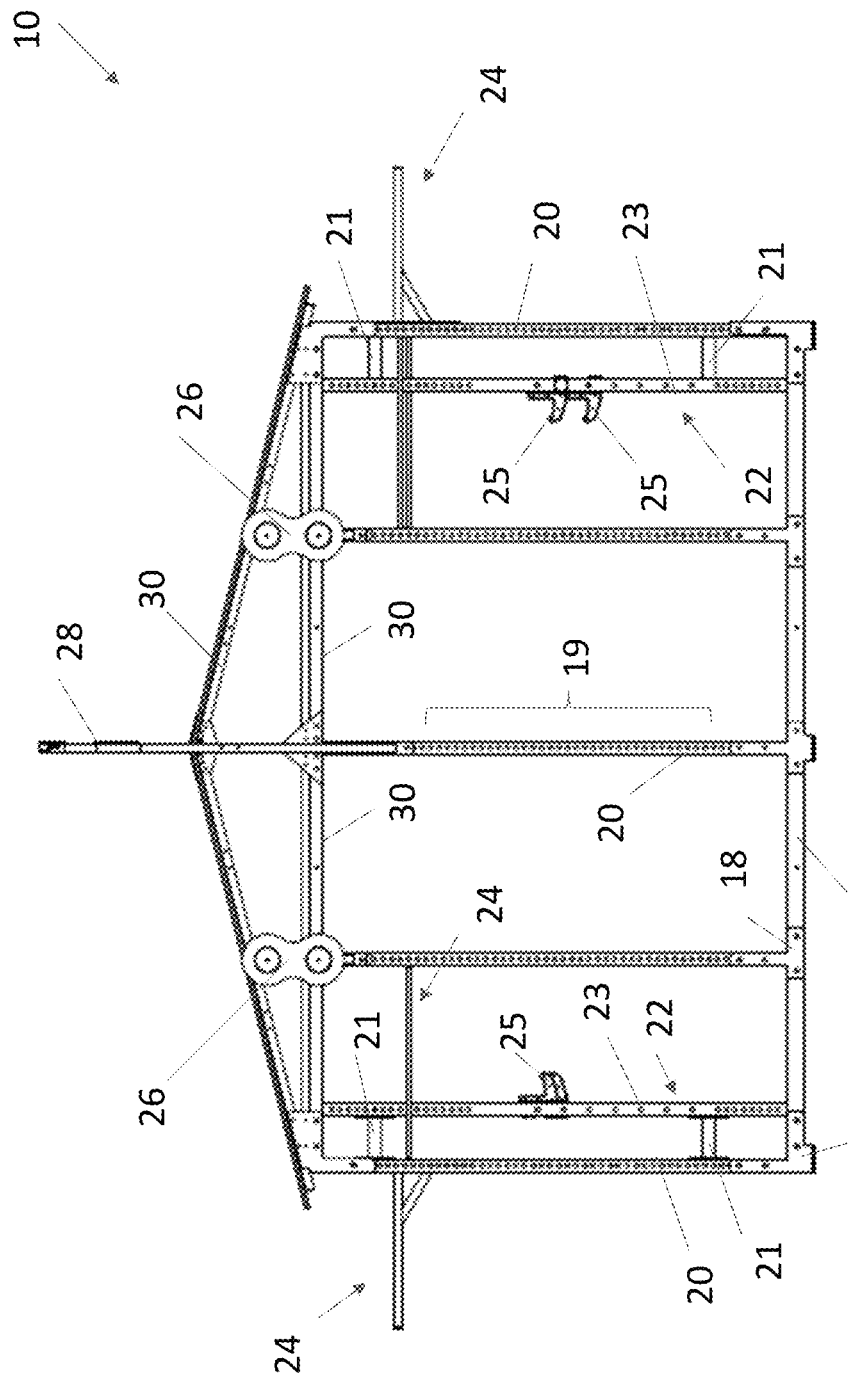
FIG. 5 is a front elevation view of the pavilion of FIG. 1.
Figure 6:
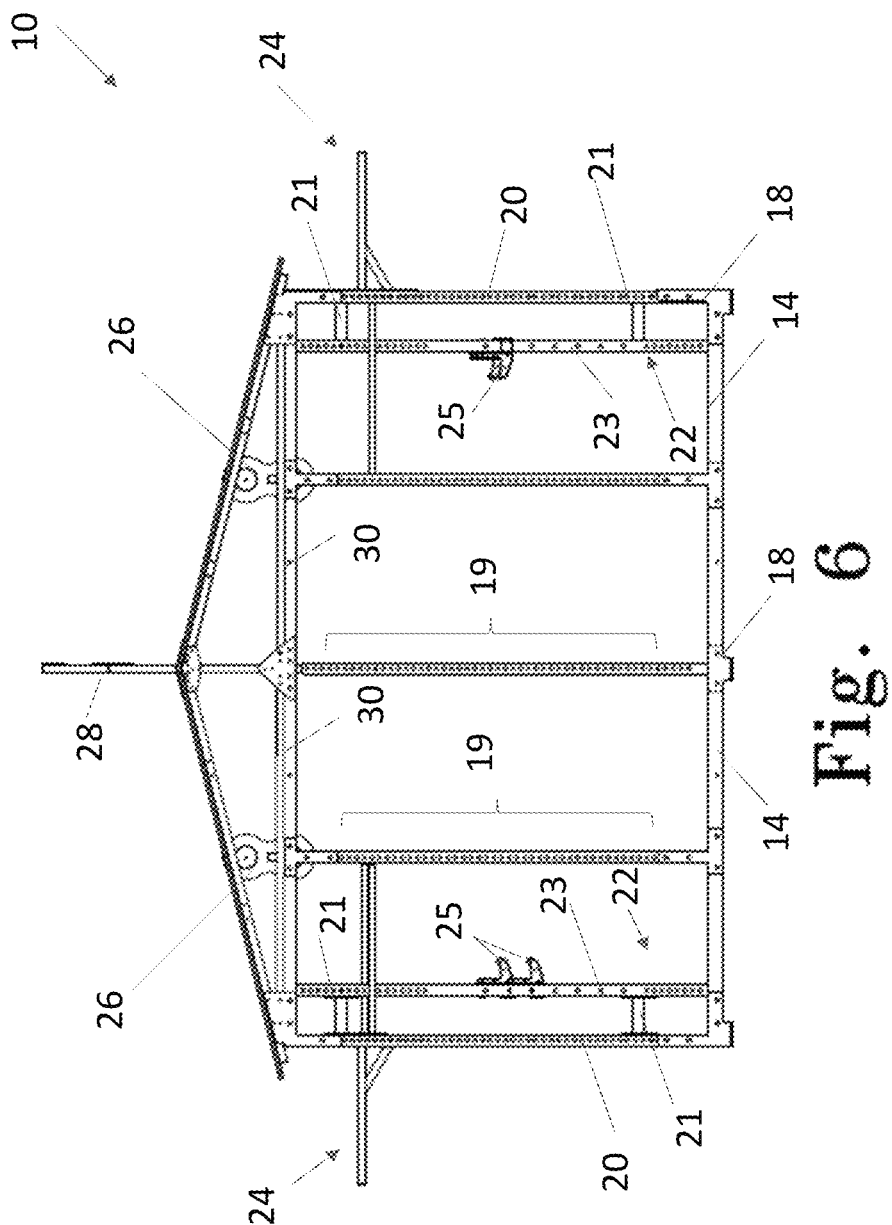
FIG. 6 is a rear elevation view of the pavilion of FIG. 1.
Figure 7:
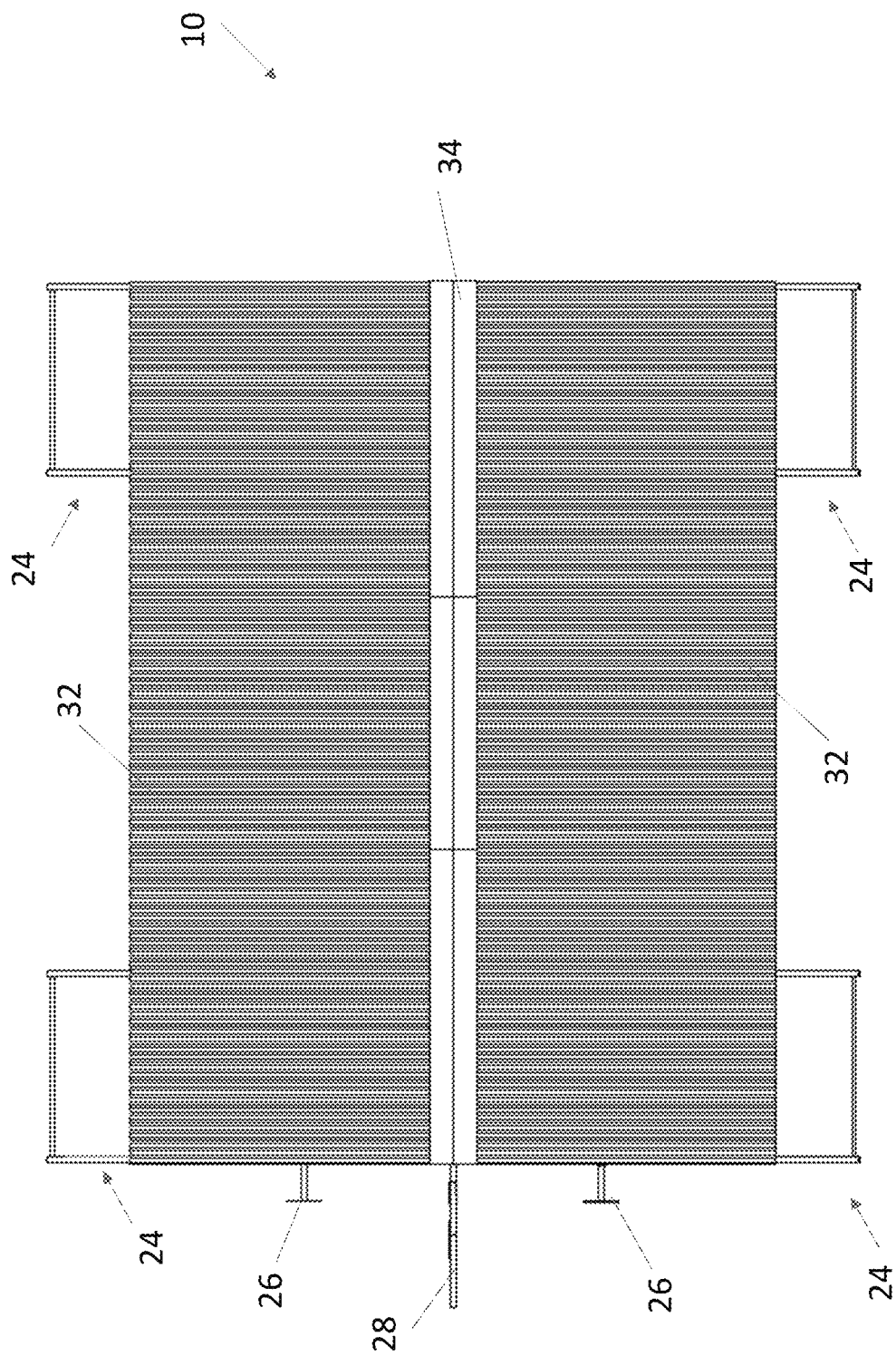
FIG. 7 is a top plan view of the pavilion of FIG. 1.
Figure 8:
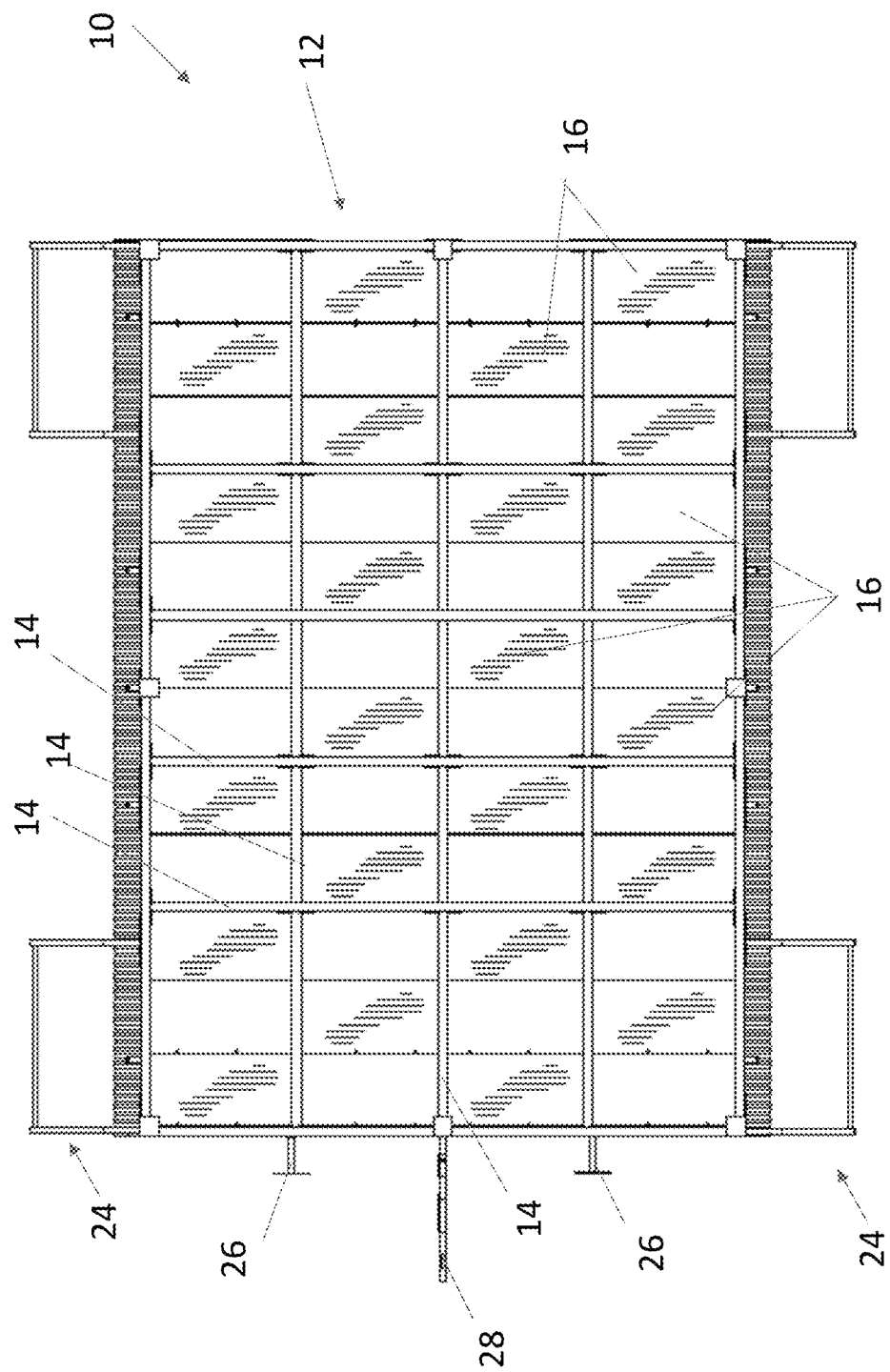
FIG. 8 is a bottom plan view of the pavilion of FIG. 1.

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

FIG. 1 through FIG. 9 illustrate an exemplary outdoor fitness pavilion 10. The pavilion 10 may comprise a floor substructure 12. The floor substructure 12 may comprise a number of floor support members 14. The floor substructure 12 may comprise a number of floor panels 16. In exemplary embodiments, without limitation, the floor support members 14 are interconnected into a grid, such as shown with particular regard to at least FIG. 2. In exemplary embodiments, without limitation, some or all of the grid sections may extend approximately 24"×24" in size, though any size and/or configuration may be utilized. In exemplary embodiments, without limitation, lengthwise extending ones of the floor support members 14 may comprise unitary members, and crosswise extending ones of the floor support members 14 may extend between the lengthwise extending ones of the floor support members 14. A lengthwise direction and dimension of the illustrated embodiment of the pavilion 10 is generally indicated at item "L" of FIG. 1. This arrangement may provide strength and the ability to modularly size the floor substructure 12, and/or the pavilion 10 more generally, into a number of sizes or shapes. In exemplary embodiments, without limitation, the floor substructure 12 defines a substantially rectangular footprint, though any size and/or shape may be utilized.

The floor support members 14 may comprise metal, such as steel or steel alloy, by way of non-limiting example. The floor support members 14 may be secured to one another by adhesive, welding, fasteners, combinations thereof, or the like. Fasteners may include, for example without limitation, one or more of bolts, nuts, washers, screws, pins, combinations thereof, or the like. Alternatively, or additionally, some or all of the floor support members 14 may be secured to one another by way of brackets 18, in exemplary embodiments, without limitation. At least some of the brackets 18 may be configured to permit the lengthwise extending ones of said floor support members 14 to extend a length of the floor substructure 12 in a unitary fashion while connecting crosswise extending ones of the floor support members 14. For example, without limitation, such brackets 18 may extend above and/or below the lengthwise extending ones of said floor support members 14 between the crosswise extending ones of the floor support members 14. A crosswise direction and dimension of the illustrated embodiment of the pavilion 10 is generally indicated at item "C" of FIG. 9. The brackets 18 need not necessarily secure the lengthwise extending ones of said floor support members 14, such as to permit modular construction, shifting, expansion/contraction, floor movement, combinations thereof, or the like.

The floor panels 16 may extend across an upper surface of the floor support members 14, such as shown with particular regard to FIG. 1. The floor panels 16, in exemplary embodiments without limitation, may comprise a number of panels. The floor panels 16 may be offset from intersection points of the floor support members 14 by way of non-limiting example. The floor panels 16 may comprise metal, plastic, wood, rubberized material, combinations thereof, or the like. The floor panels 16 may be secured to the floor support members 14 by adhesive, welding, fasteners, combinations thereof, or the like, or may be floating. Alternatively, or additionally, the floor support members 14 defining an outer perimeter of the floor substructure 12 may be elevated so as to provide a lip for securing the floor panels 16 along the outer edge. The inner one or ones of the floor panels 16 may be secured by other one or ones of the floor panels 16 and/or the floor support members 14.

In exemplary embodiments, without limitation, each of the floor panels 16 may comprise a ¼ steel plate, though any size and/or type of panel 16 may be utilized. The floor panels 16 may comprise, such as be coated with, a rubberized material or rubberized layer(s). The floor panels 16 may comprise one or more irregular shaped edges, with or without overlapping portions, such as for interlocking. The floor panels 16 may comprise a single or multiple layers.

The floor panels 16 in exemplary embodiments, without limitation, may be configured for leveling and/or adjustment, such as along said pillars 20 and/or fitness pillars 23 by securing the floor support members 14 and/or brackets 18 to the appropriate apertures 19.

The floor support members 14 may be generally cuboid in shape, though other sizes and/or shapes may be utilized. The floor panels 16 may define a generally square or rectangular footprint and may have a generally slim (e.g., less than 2 inches) thickness, though other sizes and/or shapes may be utilized. The floor panels 16 may be approximately 24"×24" in size, though any size or shape may be utilized.

The floor substructure 12 may be configured for modular construction, such as to provide various size and/or shape floor substructures 12 and/or pavilions 10. The floor substructure 12 may be configured to provide a level of flexibility, such as to absorb at least some impact of heavy weights that may be dropped and/or dynamic movement of users.

A number of pillars 20 may extend in a substantially vertical direction from the floor substructure 12. In exemplary embodiments, without limitation, the pillars 20 may be joined to the floor support members 14 extending about a perimeter of the floor substructure 12. The pillars 20 may comprise metal, such as steel or steel alloy, by way of non-limiting example. The pillars 20 may be secured to the floor support members 14 by adhesive, welding, fasteners, combinations thereof, or the like. Alternatively, or additionally, some or all of the pillars 20 may be secured to the floor support members 14 by way of brackets 18, in exemplary embodiments, without limitation.

The pillars 20 may be generally cuboid in shape, though other sizes and/or shapes may be utilized.

The pillars 20 may comprise apertures 19. The apertures 19 may be spaced apart along a length of one or more sides of the pillars 20 in exemplary embodiments, without limitation. Any number of apertures 19 of any size, shape, and/or location may be provided. Different number, size, shape, and/or locations of apertures 19 may be provided on each face of the pillars 20, and/or some of the faces may comprise no such aperture 19. The apertures 19 may be configured to accommodate bolts or other fasteners, such as for joining the pillar 20 to the brackets 18, the floor support member 14, roof support members 30, combinations thereof, or the like.

Alternatively, or additionally, the apertures 19 may be configured to accommodate various items of fitness equipment, such as further shown and/or described herein. For example, without limitation, the pavilion 10 may comprise one or more pull-up bars 24. The pull-up bars 24 may extend in a linear fashion directly between two given ones of the pillars 20. These are sometimes referred to as straight pull-up bars. Alternatively, or additionally, the pull-up bars 24 may protrude outward a distance from two given ones of the pillars 20. These are sometimes referred to as kipping pull-up bars.

In exemplary embodiments, without limitation, the apertures 19 may be provided at each of the pillars 20, such as to permit connection of the integrated fitness equipment items in a variety of arrangements to provide various arranged pavilions 10 and/or permit periodic and/or modular updating to the same.

Alternatively, or additionally, the apertures 19 may be configured to permit water and/or airflow.

At least the kipping pull-up bars 24 may extend outward from the pavilion 10, such as away from, and outside of, the floor substructure 12 and/or a roof substructure 36. At least the straight pull-up bars 24 may extend along the floor support members 14 forming a perimeter of the flooring substructure 12.

The pull-up bars 24 may be provided between some, or all, of the pillars 20 in exemplary embodiments without limitation. The pull-up bars 24 may be provided at some, of all, faces of the pavilion 10, in exemplary embodiments without limitation. The pull-up bars 24 may be provided at a same or different heights from one another, such as to accommodate various size users or facilitate different fitness activities.

As another example, without limitation, the pavilion 10 may comprise one or more rope holders 26. The rope holder(s) 26 may extend from one or more of the pillars 20. The rope holders 26 may be external facing and may be spaced from the pillars 20 such as to extend outside of the roof substructure 36. The rope holders 26 may be configured to temporarily secure lengths of rope for fitness activities, such as climbing.

As another example, without limitation, the pavilion 10 may comprise one or more rope hangers 28. The rope hanger(s) 28 may extend from one or more of the pillars 20. The rope hangers 28 may be external facing and may be spaced from the pillars 20 such as to extend outside of the roof substructure 36. The rope hangers 28 may be provided at some, or all, of the pillars 20. The rope hangers 28 may comprise one or more full or partial loops, carabiners, or the like configured to receive a rope for fitness activities, such as climbing.

The rope holders 26 and/or rope hangers 28 may be provided at some, of all, faces of the pavilion 10, in exemplary embodiments without limitation. The rope holders and hangers 26 and 28 may be provided at a same face of the pavilion 10 in exemplary embodiments, without limitation. A first and second rope holder 26 may be provided at either side of a rope hanger 28 in exemplary embodiments, without limitation.

The rope holders and/or hangers 26 and 28 may extend outward from the pavilion 10, such as away from, and outside of, the floor substructure 12 and/or the roof substructure 36.

While the integrated fitness equipment items may be joined to the pillars 20 by way of fasteners passing through the aperture 19, alternatively, or additionally, the integrated fitness equipment items may be joined to the pillars 20 by welding, adhesive, integral formation, combinations thereof, or the like.

The pavilion may comprise the roof substructure 36. The roof substructure 36 may comprise one or more roof support members 30. At least some of the roof support members 30 may be connected to, and/or extend between, the pillars 20, in exemplary embodiments without limitation. At least some of the roof support members 30 may form a supporting gable for the roof substructure 36.

The roof support members 30 may comprise metal, such as steel or steel alloy, by way of non-limiting example. The roof support members 30 may be secured to the pillars 20 and/or one another by adhesive, welding, fasteners, brackets 18, combinations thereof, or the like.

The roof substructure 36 may comprise one or more roofing panels 32. The roofing panels 32 may comprise corrugated metal, though other type of roofing material and/or panels 32 may alternatively or additionally be utilized including, for example without limitation, asphalt, shingle, standing seam, combinations thereof, or the like.

The roof substructure 36 may comprise one or more roof joining panels 34. The roof joining panels 34 may extend between the roofing panels 32 and/or the roof support members 30 for joining the same. The roof panels 32 may be joined to the roof support members 30 and/or the roof joining panels 34 by way of brackets 18, fasteners, welding, adhesives, integral formation, combinations thereof, or the like.

The pavilion 10 may comprise one or more integrated fitness racks 22. The integrated fitness racks 22 may be types of exemplary integrated fitness equipment of the pavilion 10. In exemplary embodiments, the integrated fitness racks 22 may comprise squat racks. The integrated fitness racks 22 may be attached to two adjacent ones of the pillars 20. Spacers 21 may extend from the pillars 20 to fitness pillars 23. The fitness pillars 23 may be located interior to the pillars 20, such as within the floor substructure 12 and/or roof substructure 36. In exemplary embodiments, without limitation, two of the spacers 21 may extend between each of the pillars 20 and the fitness pillars 23, though any number of the spacers 21 in any arrangement may be utilized. The fitness pillars 23 may extend substantially vertically and/or substantially parallel with the pillars 20. Some or all of the fitness pillars 23 may be connected to, and provide additional support to, the roof substructure 36, such as by way of the roof support members 30. Put differently, at least some of the fitness pillars 23 may be attached to the roof support member 30. For example, without limitation, each of the fitness pillars 23 may be attached to one of the roof support members 30 the associated one of the pillars 20 is also attached to. The fitness pillars 23 may be connected to the floor substructure 12, such as the flooring panels 16 and/or the floor support members 14. The fitness pillars 23 may alternatively be free on a lower and/or upper end thereof.

The fitness pillars 23 may comprise apertures 19. The apertures 19 may accommodate one or more barbell holders 25, such as J-hooks and/or safety rails. The barbell holders 25 may be connected to the fitness pillars 23, in exemplary embodiments without limitation, by way of pins, bolts, fasteners, or the like. In this fashion, the barbell holders 25 may be selectively repositioned along the fitness pillars 23.

The fitness pillars 23 and/or spacers 21 may be generally cuboid in shape, though other sizes and/or shapes may be utilized. The spacers 21 may be joined to the pillars 20 and/or the fitness pillars 23 by way of fasteners passing through the aperture 19, welding, adhesive, integral formation, brackets 18, combinations thereof, or the like. The fitness pillars 23 and/or spacers 21 may comprise metal, such as steel or steel alloy, by way of non-limiting example.

Any number and/or arrangement of the integrated fitness racks 22 may be provided on some or all sides of the pavilion 10. Integrated fitness racks 22 of the same or different type, size, shape, or the like may be utilized.

In exemplary embodiments, without limitation, multiple ones of the integrated fitness racks 22 may be provided along a first and second side of the pavilion. The first and second sides may, for example without limitation, be associated with the lengthwise dimension L of the pavilion 10. Pull-up bars 24 may be provided along the first and second sides. One of the rope hangers 28 may be provided at a third side of the pavilion 10 extending between the first and second sides, such as at a central pillar 20 and/or portion thereof. A first and second one of the rope holders 26 may be provided at either side of the rope hanger 28 on the third side, by way of non-limiting example. A peek of the roof substructure 36 may extend along the lengthwise dimension L of the pavilion 10 in exemplary embodiments, without limitation. This may permit the third side and a fourth side (opposing the third side, extending between the first and second sides) of the pavilion 10 to be largely open.

The floor support member 14 extending along the lengthwise dimension L of the pavilion 10 may be unitary, in exemplary embodiments, without limitation.

Figure 9:
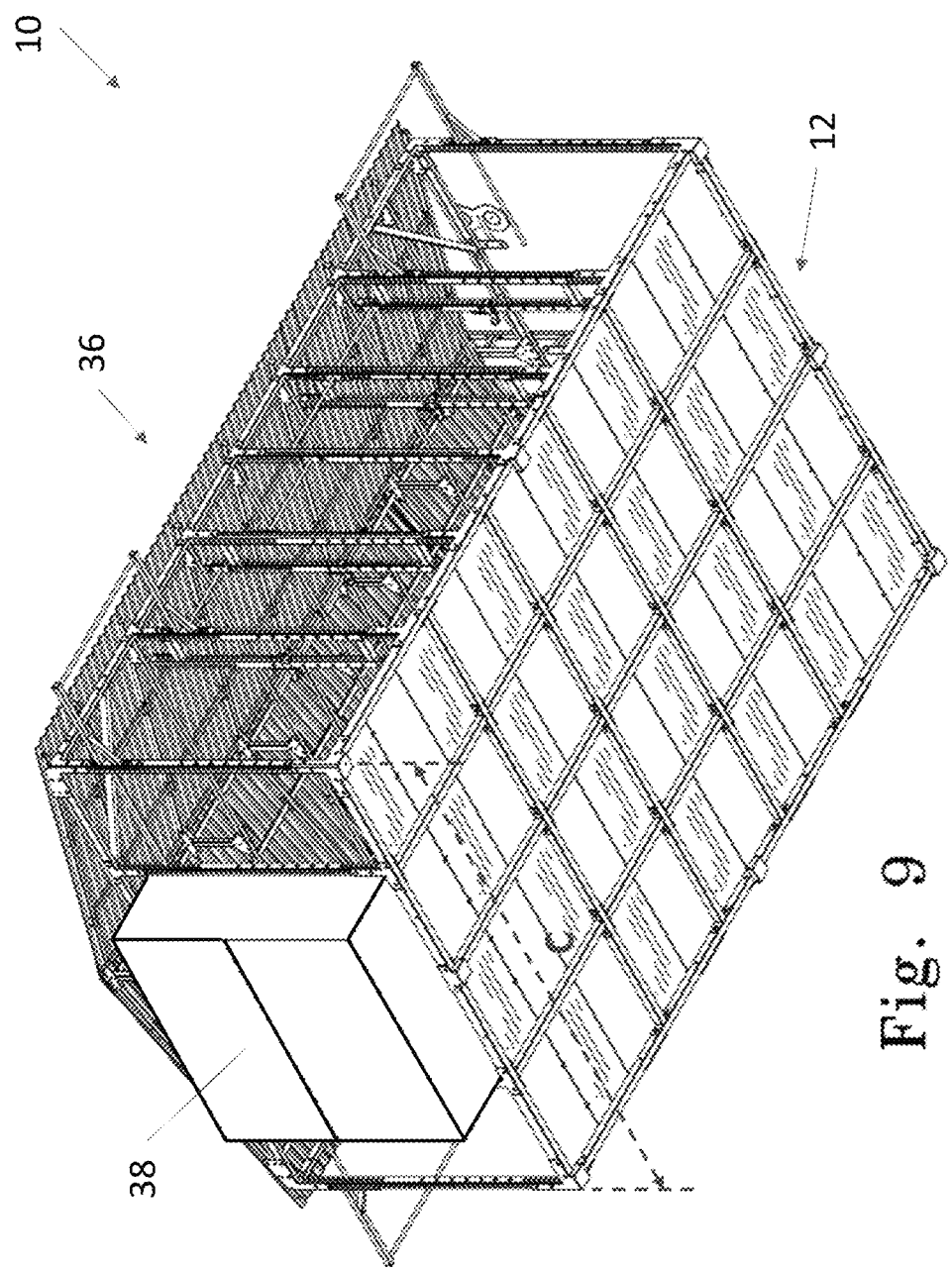
FIG. 9 is a bottom perspective view of the pavilion of FIG. 1 with certain exemplary storage compartments.
Figure 10:
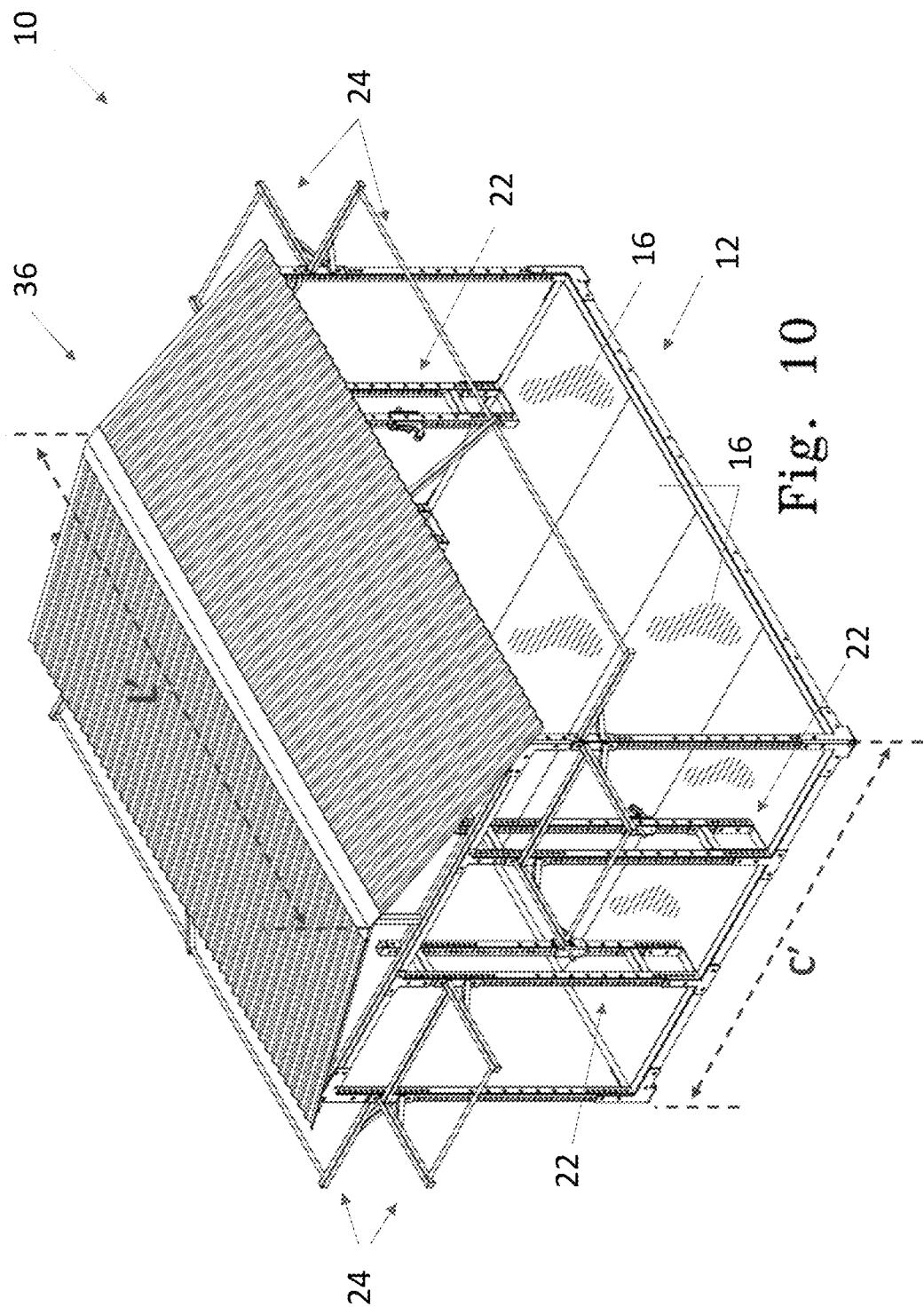
FIG. 10 is a top perspective view of another exemplary embodiment of the outdoor fitness pavilion.
Figure 11:
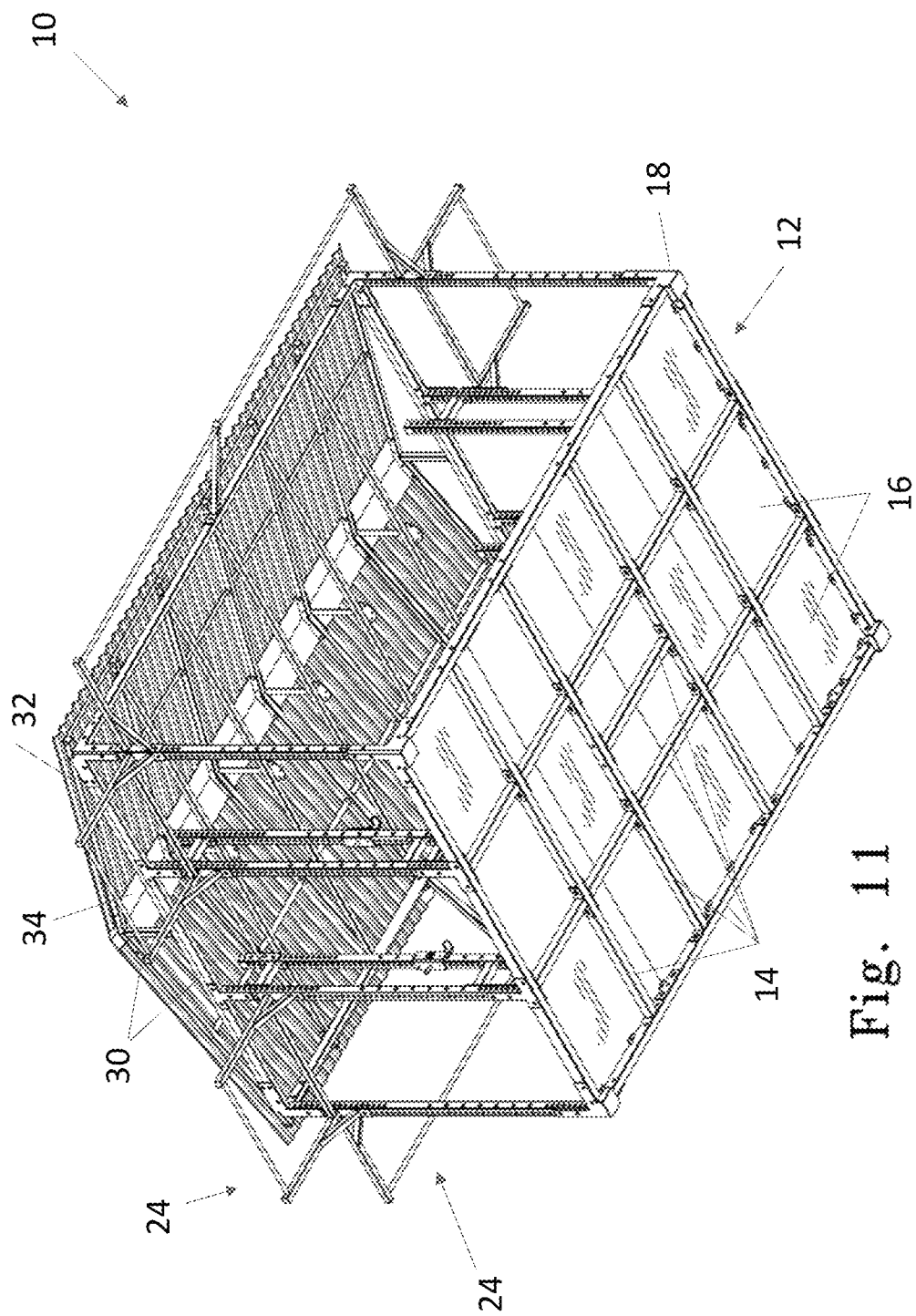
FIG. 11 is a bottom perspective view of the pavilion of FIG. 10.
Figure 12:
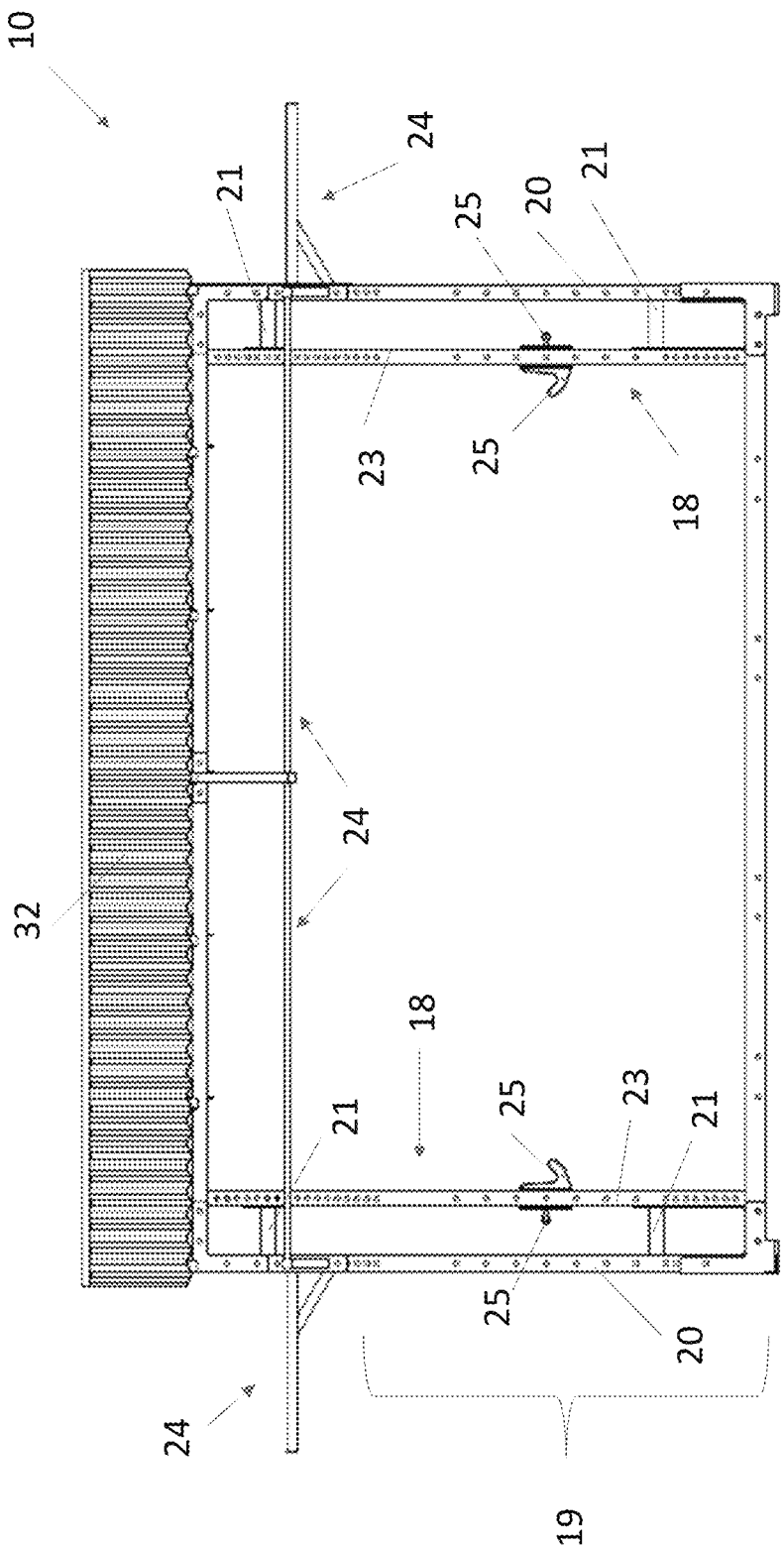
FIG. 12 is a right side elevation view of the pavilion of FIG. 10.
Figure 13:
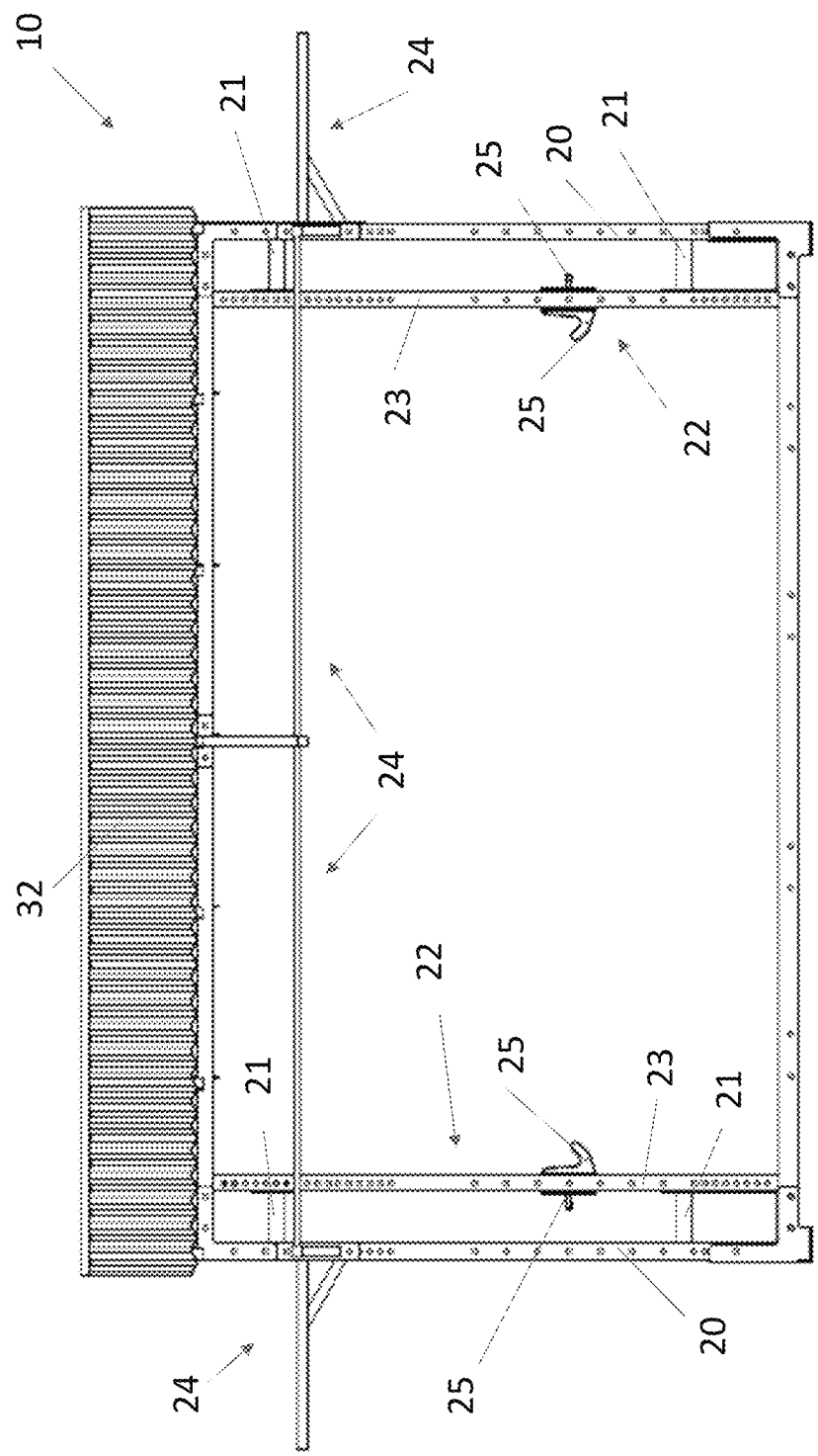
FIG. 13 is a left side elevation view of the pavilion of FIG. 10.
Figure 14:
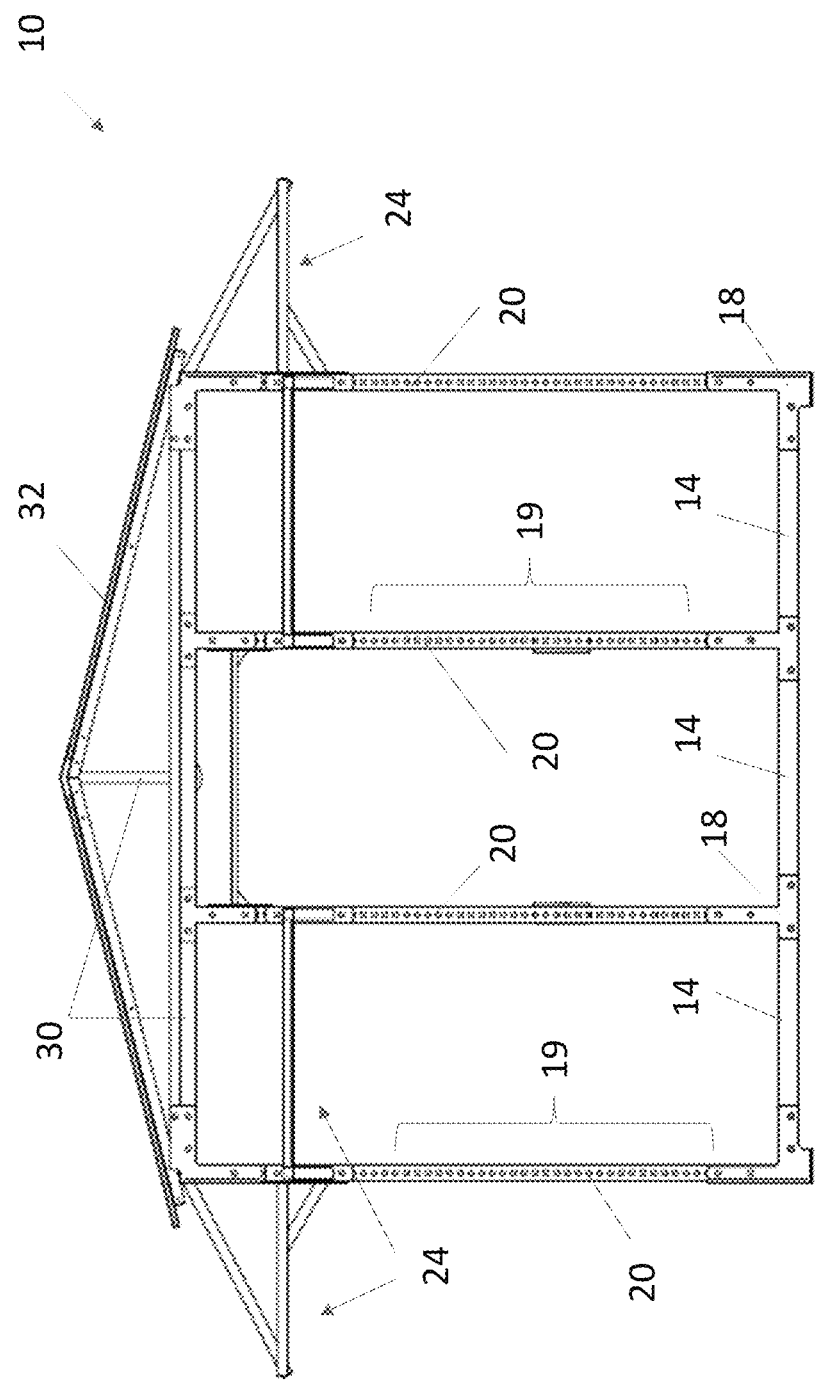
FIG. 14 is a front elevation view of the pavilion of FIG. 10.
Figure 15:
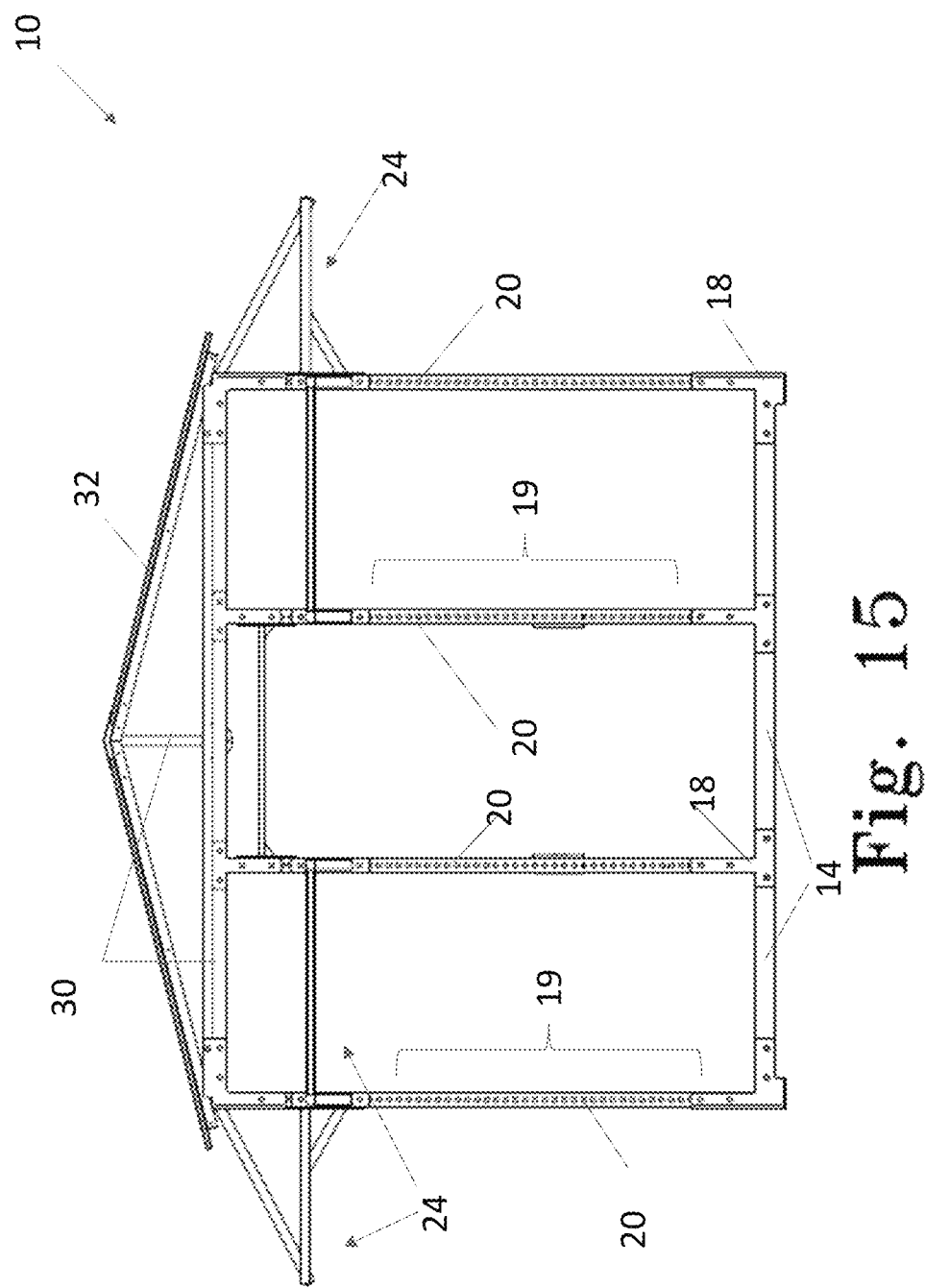
FIG. 15 is a rear elevation view of the pavilion of FIG. 10.
Figure 16:
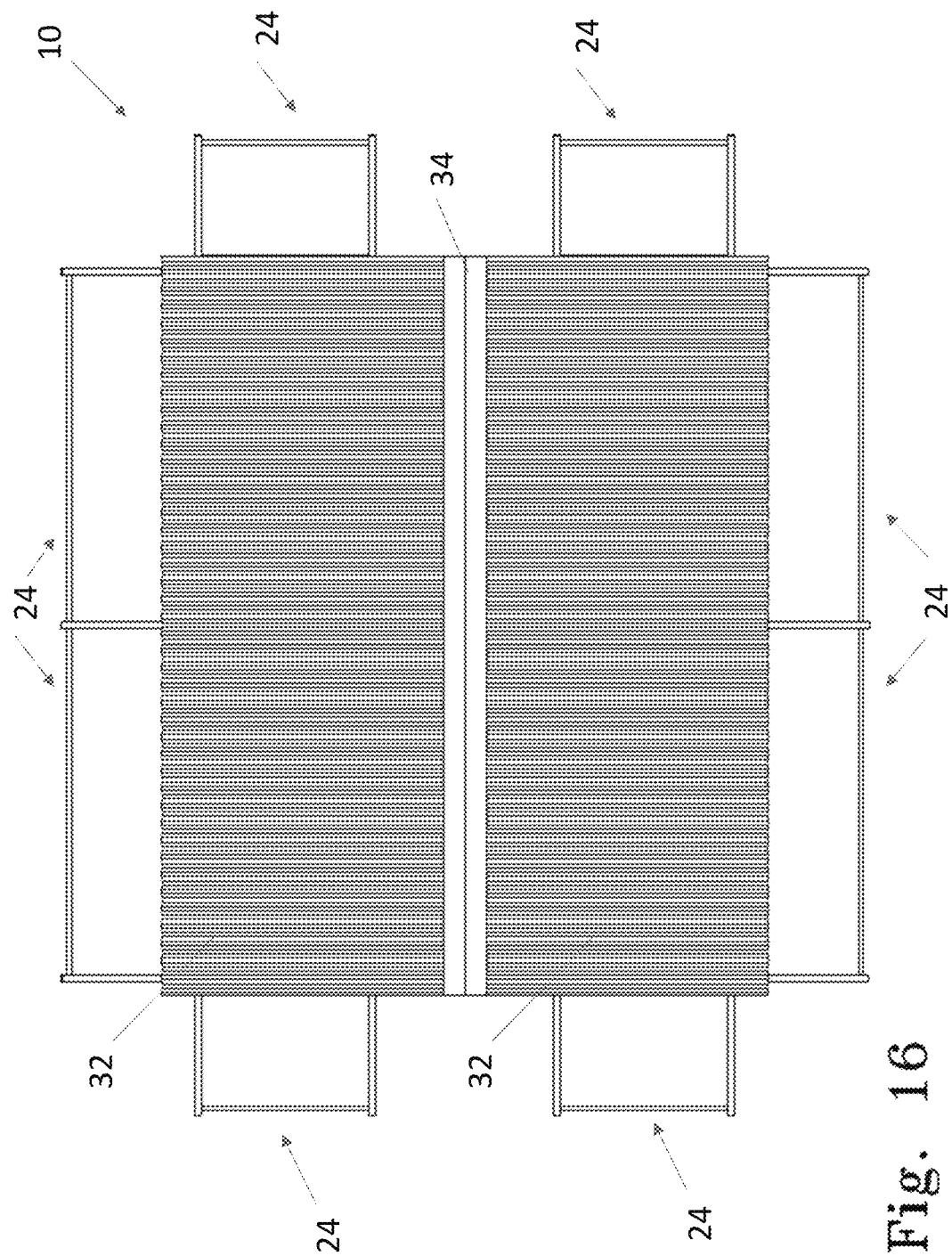
FIG. 16 is a top plan view of the pavilion of FIG. 10.
Figure 17:
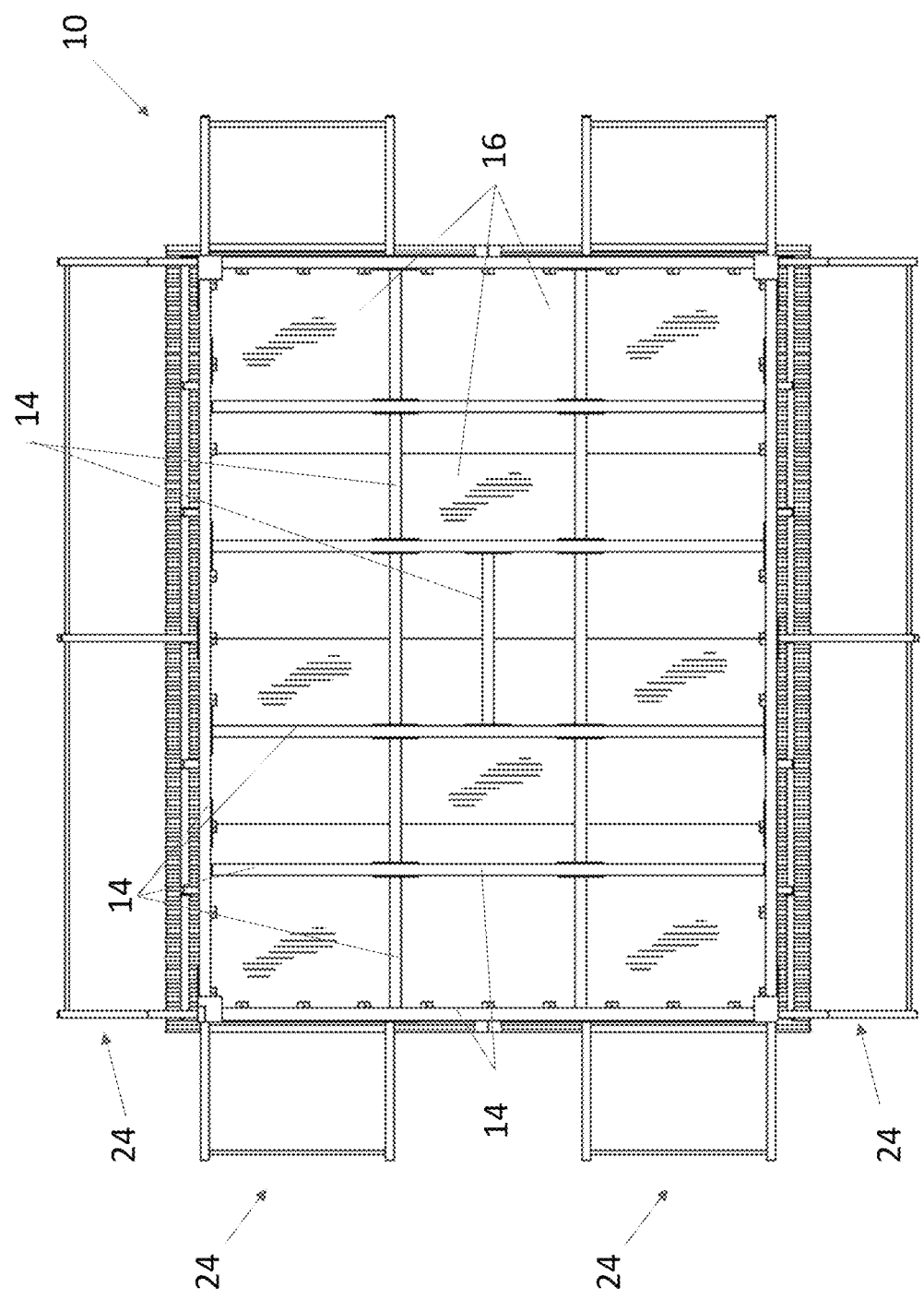
FIG. 17 is a bottom plan view of the pavilion of FIG. 10.
Figure 18:
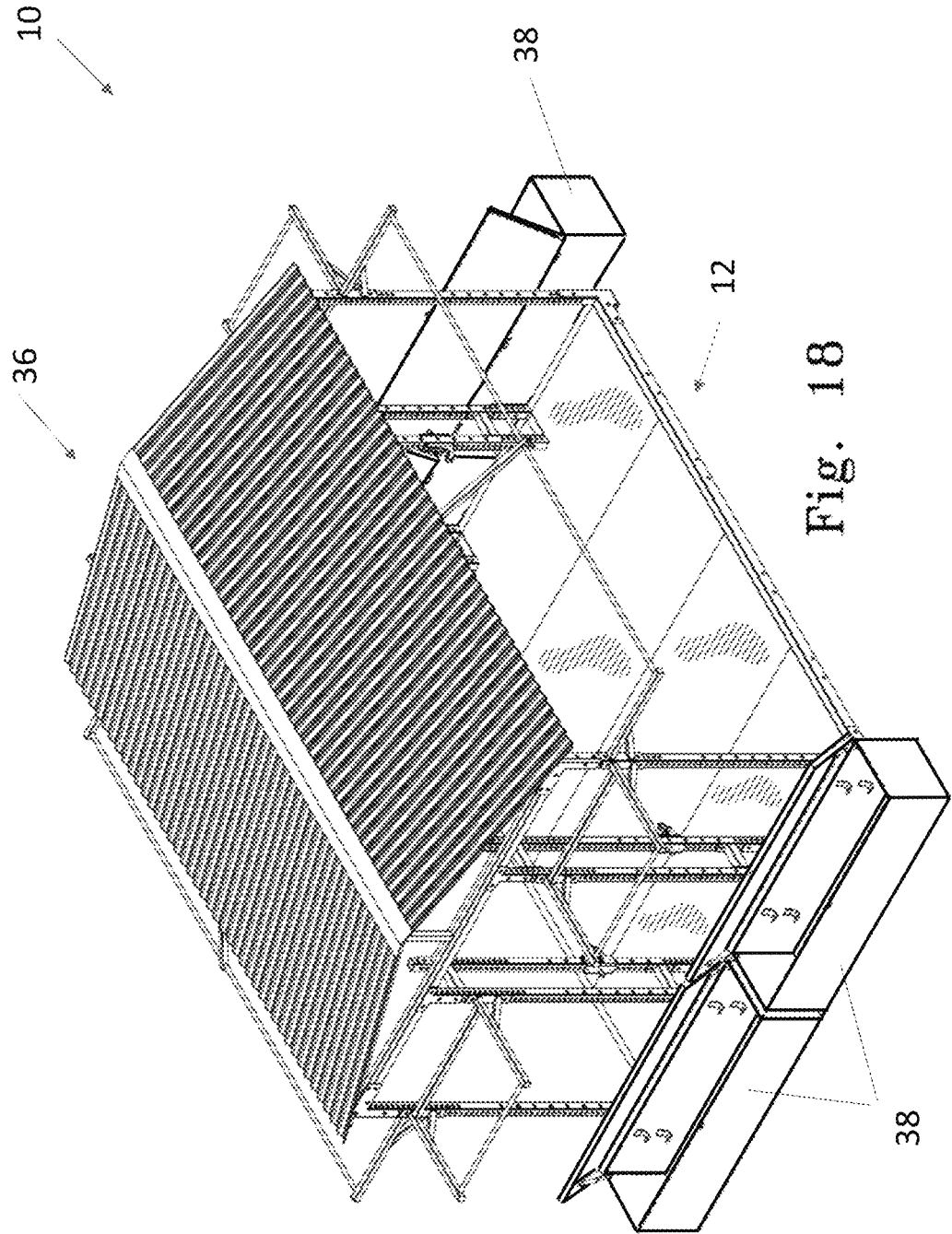
FIG. 18 is a top perspective view of the pavilion of FIG. 10 with certain exemplary storage compartments.

As illustrated with particular regard to at least FIG. 9, the pavilion 10 may comprise one or more storage structures 38. The storage structures 38 may comprise cabinets, shelves, compartments, combinations thereof, or the like. The storage structures 38 may be configured to store fitness equipment including, for example without limitation, free weights (e.g., barbells, weight plates, kettlebells, combinations thereof, or the like), resistance bands, medicine balls, jump ropes, cones, ladders, ropes, combinations thereof, or the like. The storage structures 38 may be wholly or partially open and/or may comprise one more closing doors, lids, access panels, combinations thereof, or the like. The storage structures 38 may be weather tight when closed and/or lockable. The storage structures 38 may be provided at one or more sides of the pavilion 10. Any number, type, and/or kind of the storage structures 38 may be provided. One or more walls 44 may be provided, however. Such as for mounting equipment, climbing or other fitness purposes, combinations thereof, or the like.

Other integrated fitness equipment items may be provided and/or attached to the pavilion 10, including for example without limitation, punching bags.

FIG. 10 through FIG. 18 illustrates another exemplary embodiment of the pavilion 10. Various size and/or shape pavilions 10 may be constructed. The illustrated embodiments are merely exemplary and are not intended to be limiting. A lengthwise direction and dimension of the illustrated embodiment of the pavilion 10 is generally indicated at item "L'" of FIG. 10. A crosswise direction and dimension of the illustrated embodiment of the pavilion 10 is generally indicated at item "C'" of FIG. 10.

The flooring panels 16 may be provided in a variety of shapes and/or sizes. In exemplary embodiment, without limitation, the flooring panels 16 may be configured to span the crosswise dimension C' of the pavilion 10. The floor support member 14 may be provided in a variety of arrangements. Pull-up bars 24 may be provided in a variety of sizes and/or shapes. Some or all the pull-up bars 24 may be, alternatively or additionally, mounted to the roofing support members 30. Such pull-up bars 24 may be connected to the pillars 20 and the roofing support members 30. This may optionally permit the pull-up bars to extend a longer distance, thereby providing an extended exercise area.

In exemplary embodiments, without limitation, multiple ones of the integrated fitness racks 22 may be provided along a first and second side of the pavilion. The first and second sides may, for example without limitation, be associated with the crosswise dimension C' of the pavilion 10. Pull-up bars 24 may be provided along all sides of the pavilion 10. The pavilion 10 need not necessarily include the rope hangers 28 and/or rope holders 26. A peek of the roof substructure 36 may extend along the lengthwise dimension L' of the pavilion 10 in exemplary embodiments, without limitation. The floor support member 14 extending along the lengthwise dimension L' of the pavilion 10 may be unitary, in exemplary embodiments, without limitation.

Pillars 20 not need be provided on all sides of the pavilion 10 in exemplary embodiments, without limitation. This may permit certain sides of the pavilion 10 to remain largely open.

One or more storage structures 38 may be provided at the pavilion 10. For example, without limitation, the storage structures 38 may be provided along the crosswise direction C' of the pavilion 10, though any type, kind, and/or arrangement of the storage structures 38 may be provided.

The storage structure 38 may be connected to the pavilion 10 or separate therefrom. For example, without limitation, the storage structure 38 may be welded, fastened, integrally formed with, and/or otherwise attached to the pavilion 10. The storage structure 38 may comprise one or more closeable cabinets and interior organizers such as, but not limited to, hooks, shelves, dividers, tie downs, combinations thereof, or the like.

No walls or other outer enclosure material may be provided between the pillars 20 and/or certain portions of the roof substructure 30, for example without limitation, such as to provide a substantially open-air environment for exercise within the fitness pavilion 10. The roof substructure 36 may be configured to provide some protection from sunlight and/or precipitation while still permitting airflow and an otherwise largely open-air environment.

Surface preparations may be performed prior to installation of the pavilion 10. Ground may be leveled. One or more base layers of gravel, sand, aggregate, concreate, rubberized panels, combinations thereof, or the like may be provided. The floor substructure 12 may be created by joining the floor support members 14 and securing the flooring panels 16. The pillars 20 may be erected and attached to the floor support members 14. The fitness pillars 23 and other integrated exercise equipment (e.g., barbell holders 25, rope holder 26, rope hanger 28, pull-up bars 24, combinations thereof, or the like) may be installed. The roofing substructure 36 may be installed. For example, without limitation, the roofing support members 30 may be connected to the pillars 20 and/or the fitness pillars 23. The roofing panels 32 may be installed to the roofing support members 30. The roofing joining panels may be joined to the roofing panels 32. The optional storage structures 38 may be secured.

Figure 19:
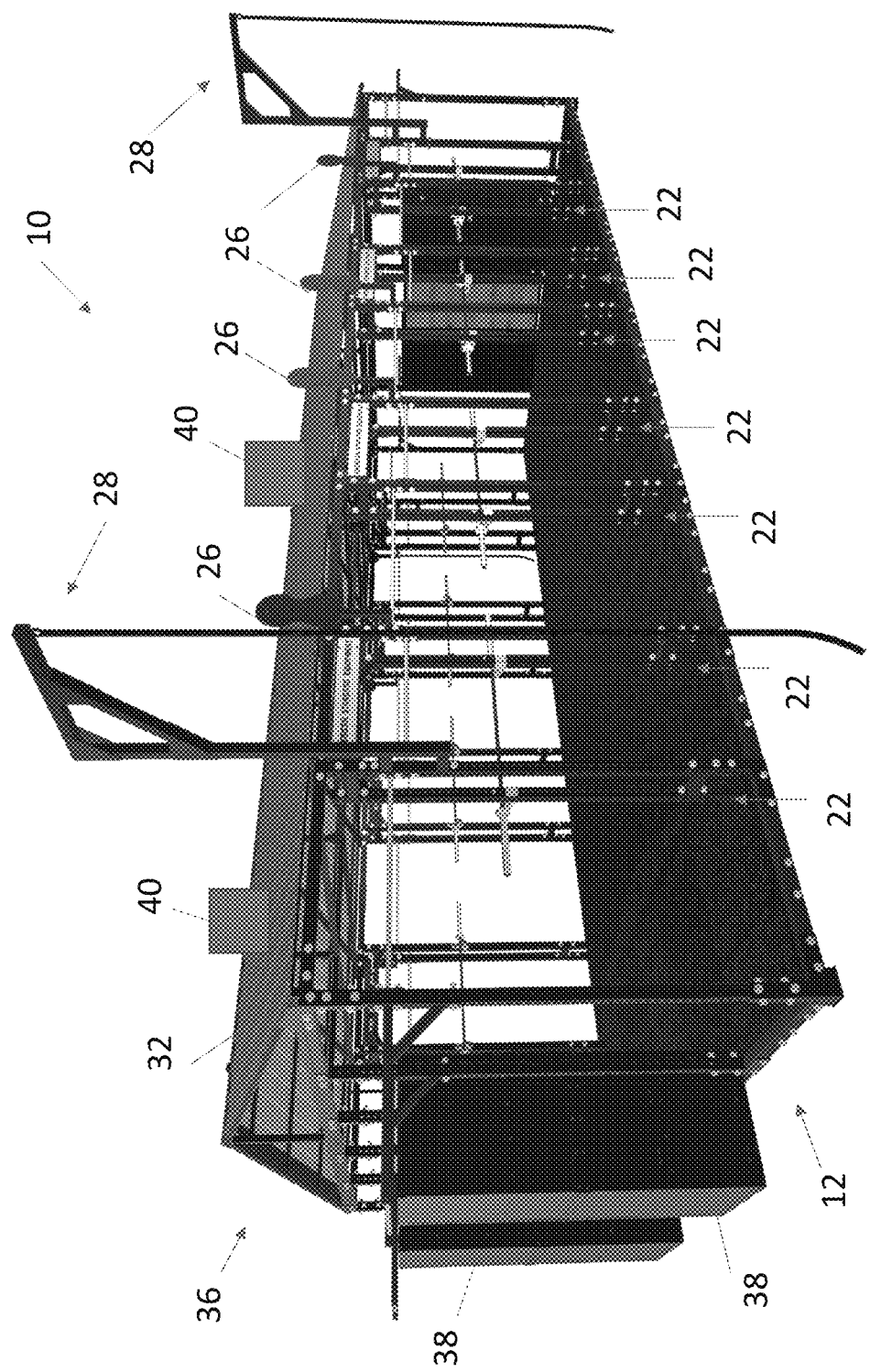
FIG. 19 is a side perspective view of another exemplary embodiment of the outdoor fitness pavilion.
Figure 20:
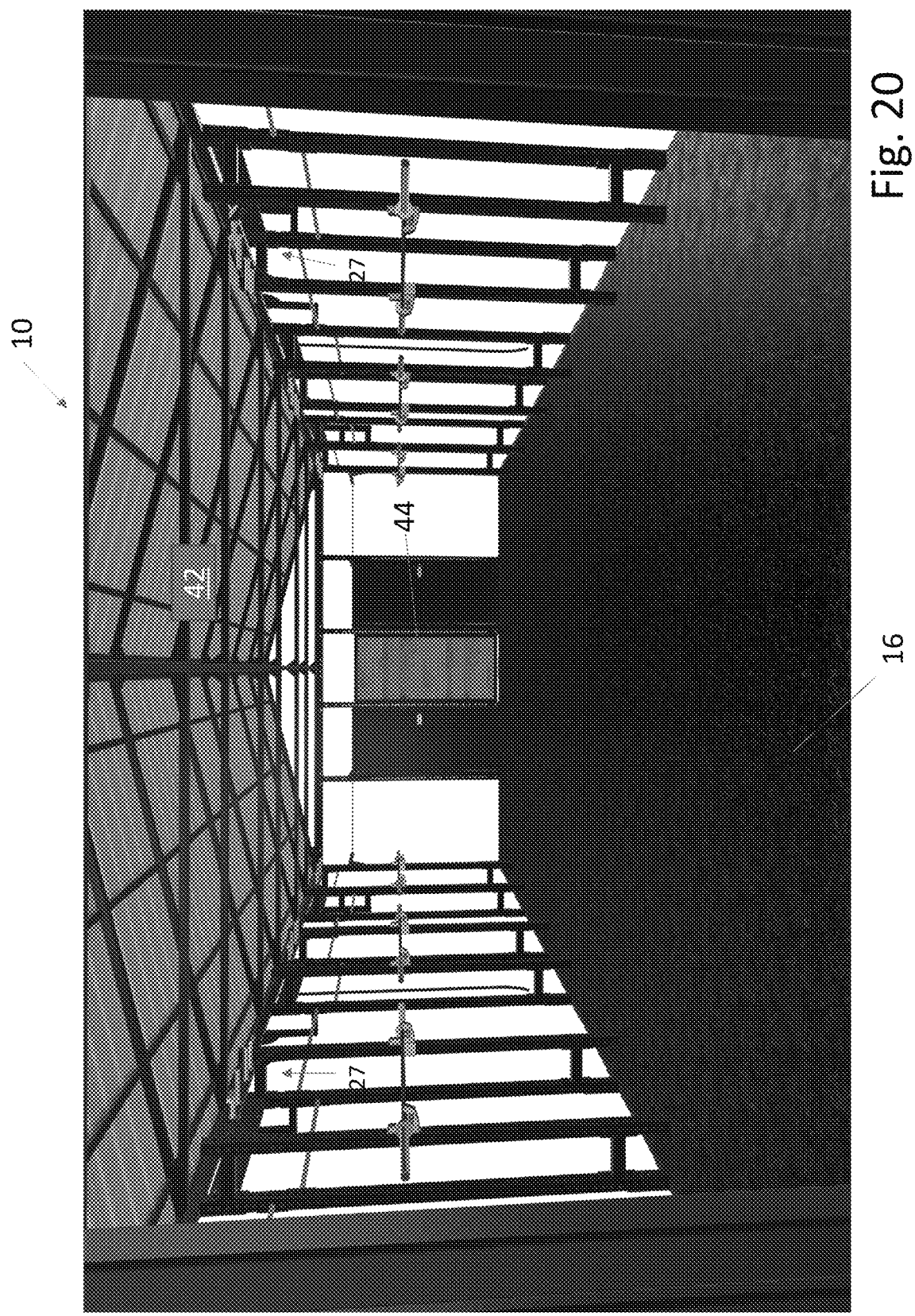
FIG. 20 is an interior front perspective view of the pavilion of FIG. 19.
Figure 21:
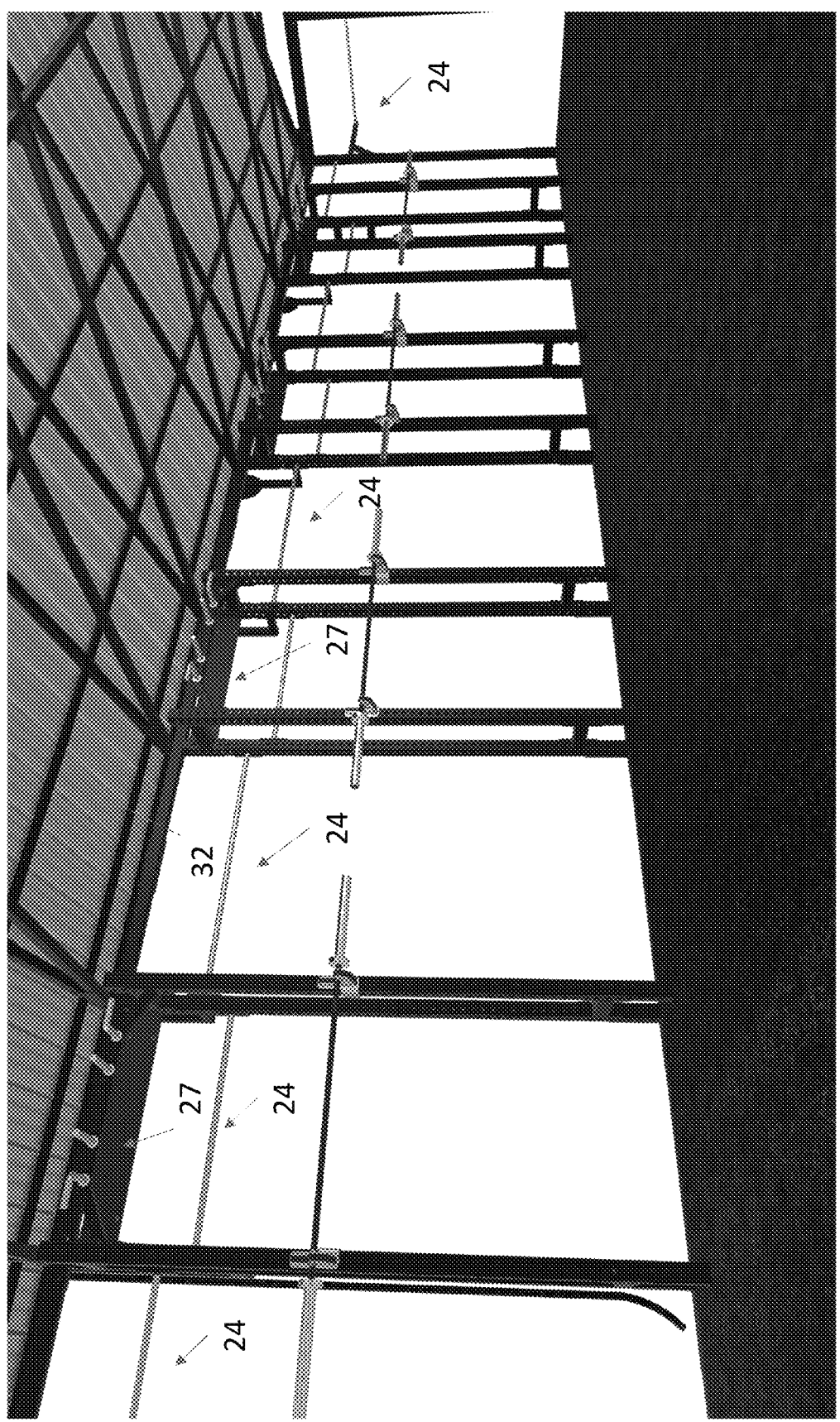
FIG. 21 an interior side perspective view of the pavilion of FIG. 19.

FIG. 19 though FIG. 21 illustrate another exemplary embodiment of the pavilion 10. Rope holders 26 and/or rope hangers 28 may be provide on side(s) of the pavilion 10 associated with a lengthwise dimension, for example without limitation. Multiple storage structures 38 may be provided at side(s) of the pavilion 10 associated with a crosswise dimension.

One or more solar panels 40 may be provided, such as at the roof substructure 36 and/or roof panels 32. The solar panel(s) 40 may be electrically connected to one or more electronic components 42, such as but not limited to, lights, fans, speakers, combinations thereof, or the like. One or more bulk energy storage devices, such as batteries, may be electrically interposed between the solar panels and the electronic component(s). Controllers may be electrically interposed to direct energy between the solar panels, the bulk energy storage devices, and the electronic components.

The integrated fitness racks 22 may comprise pull up equipment 27. The pull up equipment 27 may comprise one or more pull-up bars (such as straight, kipping, and/or handles), combinations thereof, or the like. Such pull up equipment 27 may be provided between, and at the upper end of, the fitness pillars 23 by way of non-limiting example. In this fashion, the pull up equipment 27 may be interior to the pavilion 10.

Figure 22:
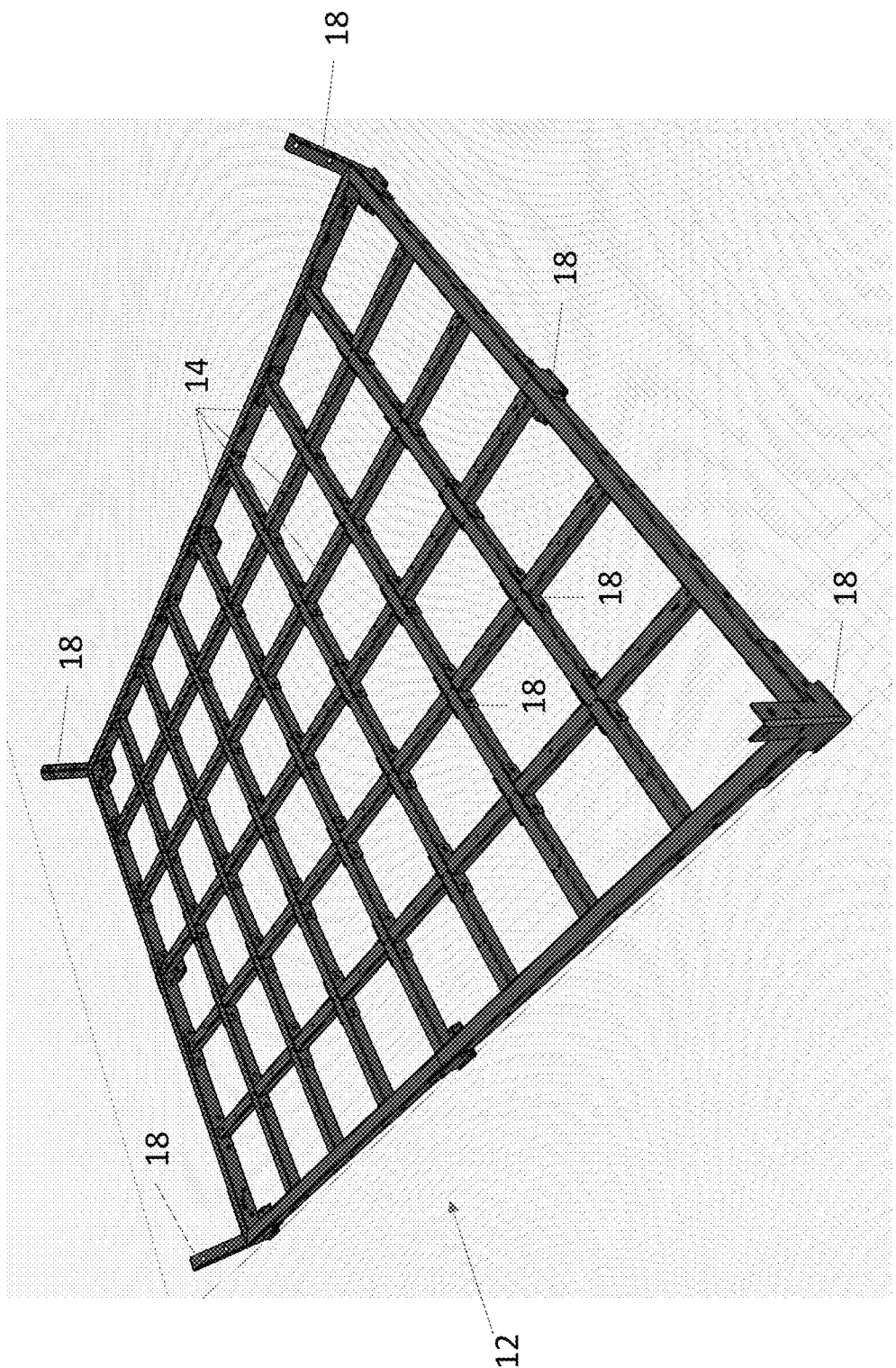
FIG. 22 is top perspective view of an exemplary embodiment of a partially assembled floor substructure for the pavilions of FIGS. 1-21.
Figure 23:
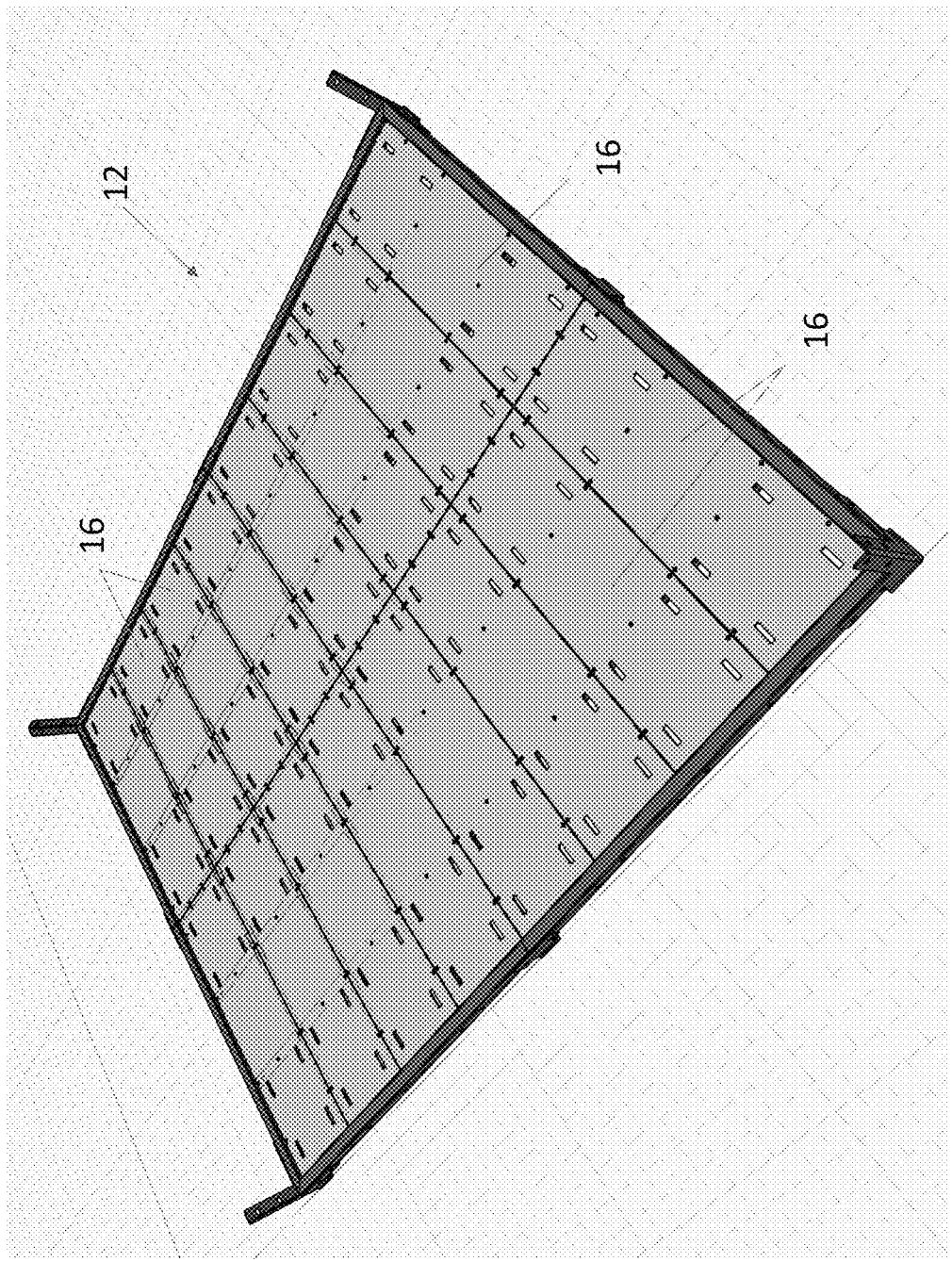
FIG. 23 is a top perspective view of the floor substructure of FIG. 22 in a further assembled state.
Figure 24:
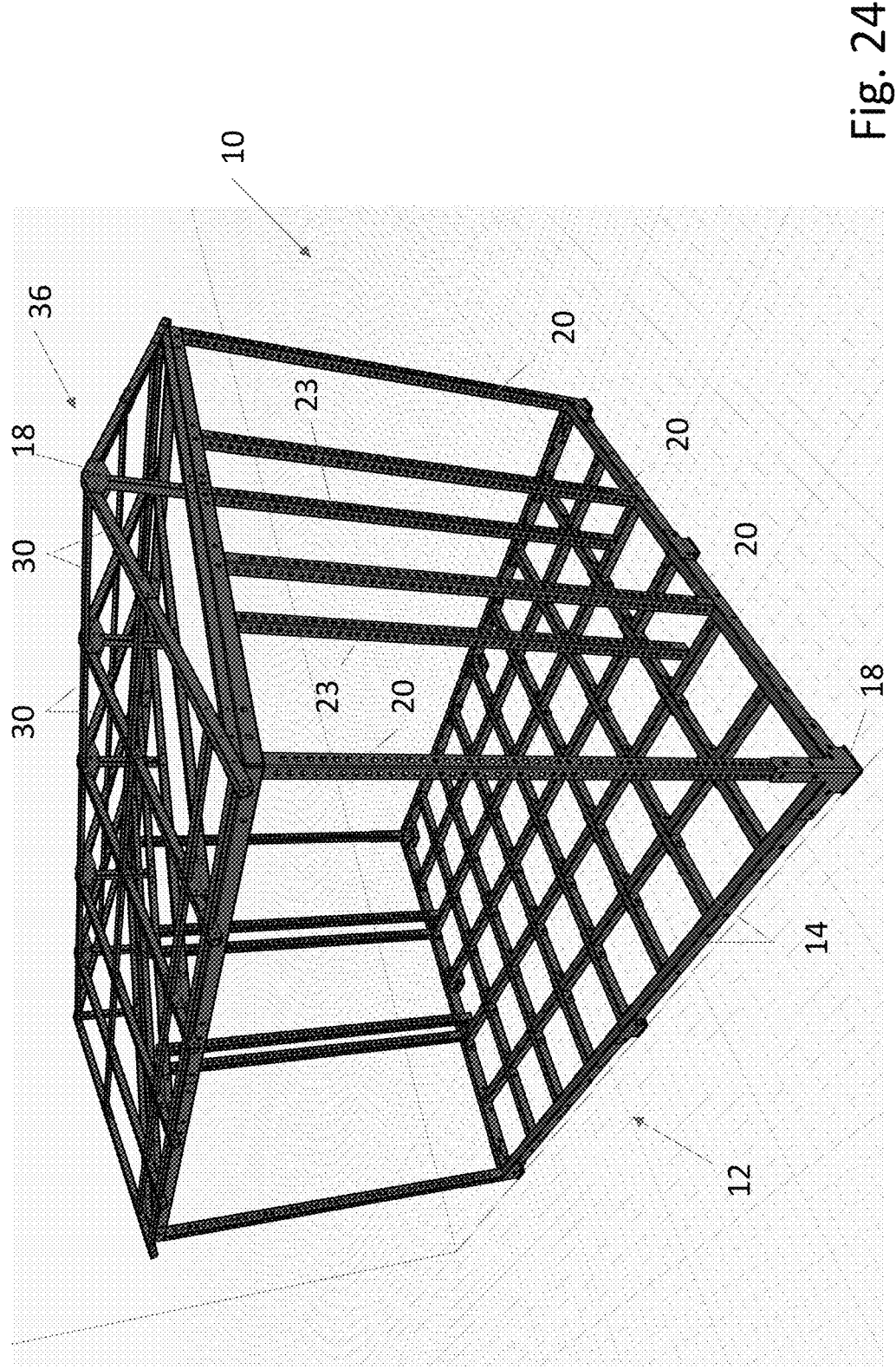
FIG. 24 is a side perspective view of the pavilion of FIGS. 22-23 in a further assembled state.
Figure 25:
FIG. 25 is a top perspective view of the further assembled pavilion of FIG. 24.

FIG. 22 illustrates the floor substructure 12 of the pavilion 10 in a partially assembled configuration, such as with the flooring panels 16 removed. FIG. 23 illustrates the floor substructure 12 with exemplary flooring panels 16 installed. FIG. 24 and FIG. 25 illustrate the pavilion 10 in a further, partially assembled configuration, such as with the floor support members 14, the pillars 20, the fitness pillars 23, and the roofing support members 30 installed. The roofing support members 30 may be interconnected. This may permit modularity in design, such as to provide the pavilion 10 in various sizes and/or shapes. In exemplary embodiments, without limitation, least some of the roofing support members 30 may be unitary. For example, without limitation, crosswise extending ones of the roof trusses may be unitary with lengthwise extending ones of the truss supports extending between each of the crosswise extending ones of the roof trusses. Brackets 18 may be utilized to so secure the roofing support members 30 to one another.

The floor substructure 12 and/or roof substructure 36 may define an interior fitness area. Any size or shape fitness area may be provided.

Examples of sizes for the pavilion 10 include, without limitation, 12'×16', 24'×16', 30'×20', 40'×20', and/or 50'×20'. The pavilion 10 may be configured for modular design to achieve the various sizes and configurations, such as by way of the floor subsystem 12 and/or the roof substructure 36.

Some or all components of the pavilion 10 may be galvanized, such as for weather resistance and/or longevity.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

What is claimed is:

1. An outdoor fitness pavilion comprising:
    a floor substructure comprising interconnected floor support members and flooring panels provided above the floor support members to define an open-air interior fitness area having a lengthwise dimension;
    pillars spaced apart about a perimeter of the floor substructure;
    a roof substructure comprising roof panels and roof support members, at least some of which are connected to said pillars and at least some of which are connected to other of said roof support members; and
    integrated fitness equipment items connected to a subset of said pillars spaced apart along said lengthwise dimension, wherein said integrated fitness equipment comprises pull-up bars and squat racks;
    wherein said squat racks comprise fitness pillars located interior to said pillars, each connected to one of said roof support members, and spacers, each extending between one of said subset of said pillars and one of said fitness pillars such that the squat racks extend inward from the pillars into the open-air interior fitness areas, below the roof substructure, and are spaced apart along the lengthwise dimension;
    wherein said pull-up bars comprise:
        straight pull-up bars, each extending between adjacent ones of said subset of said pillars and located between adjacent ones of the squat racks; and
        kipping bars, each extending outward from adjacent ones of the subset of pillars and from a footprint of the roof substructure such that the kipping bars extend outside of the open-air interior fitness area, said kipping bars extending from other adjacent ones of said subset of pillars and located between other of the squat racks such that said kipping bars are offset along the lengthwise dimension from said straight pull-up bars.

2. The outdoor fitness pavilion of claim 1:
    wherein each of said pillars and said fitness pillars comprise a series of spaced apertures;
    wherein said pull-up bars are connected to said pillars by way of said apertures; and
    further comprising barbell holders, wherein said apertures in said fitness pillars are configured to removably receive said barbell holders.

3. The outdoor fitness pavilion of claim 1 further comprising:
    additional integrated fitness equipment items comprising rope holders and at least one rope hanger, wherein said rope holders and said at least one rope hanger are connected to at least some of said roof support members and are each configured to support a rope in a fixed manner such that at least one end of the rope is hung free for climbing.

4. The outdoor fitness pavilion of claim 1 wherein:
    said roof panels comprises corrugated panels.

5. The outdoor fitness pavilion of claim 1 wherein:
    said floor support members comprises an interconnected series of lengthwise extending members and crosswise extending members; and
    said flooring panels comprise a metal layer and a rubberized layer.

6. The outdoor fitness pavilion of claim 5 wherein:
    said lengthwise extending members are unitary; and
    said crosswise extending members extend between said lengthwise extending members.

7. The outdoor fitness pavilion of claim 1 further comprising:
    brackets for securing said floor support members to said pillars, said pillars to said roof support members, and certain of said floor support members to one another.

8. The outdoor fitness pavilion of claim 1 further comprising:
    storage structures provided on at least one side of said pavilion.

9. The outdoor fitness pavilion of claim 1 further comprising:
one or more solar panels located at said roofing panels; and
electronic equipment comprising lighting in electrical connection with said solar panels.

10. An outdoor fitness pavilion comprising:
a floor substructure comprising:
lengthwise extending floor support members;
crosswise extending floor support members, wherein said crosswise extending floor support members extend between said lengthwise extending floor support members; and
flooring panels positioned atop said lengthwise extending floor support members and said crosswise extending floor support members to define an open-air interior fitness area having a lengthwise dimension and a crosswise dimension;
pillars spaced apart about a perimeter of the floor substructure and connected to some of said lengthwise extending floor support members and some of said crosswise extending floor support members;
integrated fitness equipment items connected to at least some of said pillars, said integrated fitness equipment items comprising:
a plurality of kipping bars, each connected to at least two of said pillars, a first subset of multiple of which are spaced apart along the crosswise dimension and a second subset of which extend along the lengthwise dimension; and
at least one squat rack comprising spacers and a first and second fitness pillar connected to a first and second one of said pillars by said spacers; and
a roof substructure comprising roofing panels and roof support members, a first subset of which are connected to said pillars and said fitness pillars and a second subset of which are connected to at least some other ones of said roof support members, wherein each of the kipping bars in the second subset attach, in part, to one of said roofing support members in said second subset at a mid-portion of the respective kipping bar.

11. The outdoor fitness pavilion of claim 10 wherein:
said lengthwise extending floor support members are unitary; and
crosswise extending floor support members extend between each of said lengthwise extending floor support members.

12. The outdoor fitness pavilion of claim 10 further comprising:
brackets for securing said crosswise extending floor support members to one another so that said lengthwise extending floor support members remain unitary;
brackets for securing said roof substructure to said pillars and said fitness pillars; and
brackets for securing said floor substructure to said pillars.

13. The outdoor fitness pavilion of claim 10 further comprising:
storage structures provided along said crosswise dimension and outside of said open-air interior fitness area.

14. The outdoor fitness pavilion of claim 10 wherein:
said integrated fitness equipment items comprise rope holders and at least one rope hanger;
said rope holders and said at least one rope hanger are connected to at least some of said roof support members; and
said rope holders and said at least one rope hanger are provided at along said lengthwise dimension and outside of said open-air interior fitness area and are each configured to support a rope in a fixed manner such that at least one end of the rope is hung free for climbing.

15. The outdoor fitness pavilion of claim 3 wherein:
the additional integrated fitness items are spaced apart along a lengthwise dimension of the open-air interior fitness area and extend outward from, and exterior to, the open-air interior fitness area such that at least a portion of each of the additional integrated fitness items extend beyond the footprint of the roof substructure.

16. The outdoor fitness pavilion of claim 1 wherein:
the floor substructure defines a rectangular shape.

17. The outdoor fitness pavilion of claim 10 wherein:
the floor substructure defines a rectangular shape.

* * * * *